United States Patent
Misawa et al.

(10) Patent No.: US 11,561,395 B2
(45) Date of Patent: Jan. 24, 2023

(54) HEAD-UP DISPLAY DEVICE

(71) Applicant: MAXELL, LTD., Kyoto (JP)

(72) Inventors: Akio Misawa, Kyoto (JP); Nozomu Shimoda, Kyoto (JP); Yuji Fujita, Kyoto (JP); Shigeki Hoshino, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/521,933

(22) Filed: Nov. 9, 2021

(65) Prior Publication Data

US 2022/0066209 A1 Mar. 3, 2022

Related U.S. Application Data

(62) Division of application No. 16/478,482, filed as application No. PCT/JP2018/003749 on Feb. 5, 2018, now Pat. No. 11,199,700.

(30) Foreign Application Priority Data

Feb. 15, 2017 (JP) .................................. 2017-026078
Mar. 13, 2017 (JP) .................................. 2017-047795

(51) Int. Cl.
G02B 27/01 (2006.01)
G02B 7/182 (2021.01)
G02B 17/08 (2006.01)

(52) U.S. Cl.
CPC ......... G02B 27/0101 (2013.01); G02B 7/182 (2013.01); G02B 17/08 (2013.01);
(Continued)

(58) Field of Classification Search
CPC .... G02B 27/0101; G02B 7/182; G02B 17/08; G02B 27/0149; G02B 2027/0159;
(Continued)

(56) References Cited

U.S. PATENT DOCUMENTS

2009/0160736 A1* 6/2009 Shikita ............... G02B 27/0101
345/7
2013/0242404 A1 9/2013 Kobayashi
(Continued)

FOREIGN PATENT DOCUMENTS

JP 2004-168230 A 6/2004
JP 2009-122582 A 6/2009
(Continued)

OTHER PUBLICATIONS

International Search Report of PCT/JP2018/003749 dated Apr. 10, 2018.

*Primary Examiner* — Darryl J Collins
*Assistant Examiner* — Matthew Y Lee
(74) *Attorney, Agent, or Firm* — Mattingly & Malur, PC

(57) ABSTRACT

The head-up display device includes a display element that emits image light and a virtual image optical system. The virtual image optical system includes a lens unit and a free curved surface mirror disposed along the emission direction of the image light in this order from a position close to the display element. The display element is disposed with a tilting attitude with respect to the optical axis of the lens unit with an end on the housing aperture side in an emission surface being close to an incidence surface in the lens unit and with an end on the opposite side of the housing aperture in an emission surface being apart from an incidence surface in the lens unit. The lens unit has an optical characteristic of optically enlarging an optical path length difference according to a virtual image distance difference.

3 Claims, 18 Drawing Sheets

(52) U.S. Cl.
CPC .. *G02B 27/0149* (2013.01); *G02B 2027/0159* (2013.01); *G02B 2207/117* (2013.01)

(58) Field of Classification Search
CPC ...... G02B 2207/117; G02B 2027/0163; G02B 5/10; G02B 2027/0181; G02B 2027/0185; B60K 35/00
USPC ....... 359/630, 631, 267, 633, 872, 726, 649, 359/838, 13, 727, 364, 15, 196.1–227, 359/850, 857, 861
See application file for complete search history.

(56) References Cited

U.S. PATENT DOCUMENTS

| | | | |
|---|---|---|---|
| 2014/0268359 A1* | 9/2014 | Yuki | G02B 5/205 |
| | | | 359/630 |
| 2015/0015457 A1 | 1/2015 | Takasu et al. | |
| 2016/0266283 A1 | 9/2016 | Segawa | |
| 2016/0323550 A1 | 11/2016 | Irzyk | |
| 2017/0003506 A1 | 1/2017 | Miyatake et al. | |
| 2017/0146803 A1* | 5/2017 | Kishigami | B60K 35/00 |
| 2018/0017792 A1* | 1/2018 | Takazawa | G02B 17/008 |
| 2018/0095266 A1 | 4/2018 | Takahashi | |
| 2018/0188529 A1* | 7/2018 | Sato | G02B 27/0101 |
| 2019/0329716 A1* | 10/2019 | Kubota | G02B 27/0101 |

FOREIGN PATENT DOCUMENTS

| | | |
|---|---|---|
| JP | 2015-16768 A | 1/2015 |
| JP | 2016-102966 A | 6/2016 |
| JP | 2017-504833 A | 2/2017 |

\* cited by examiner

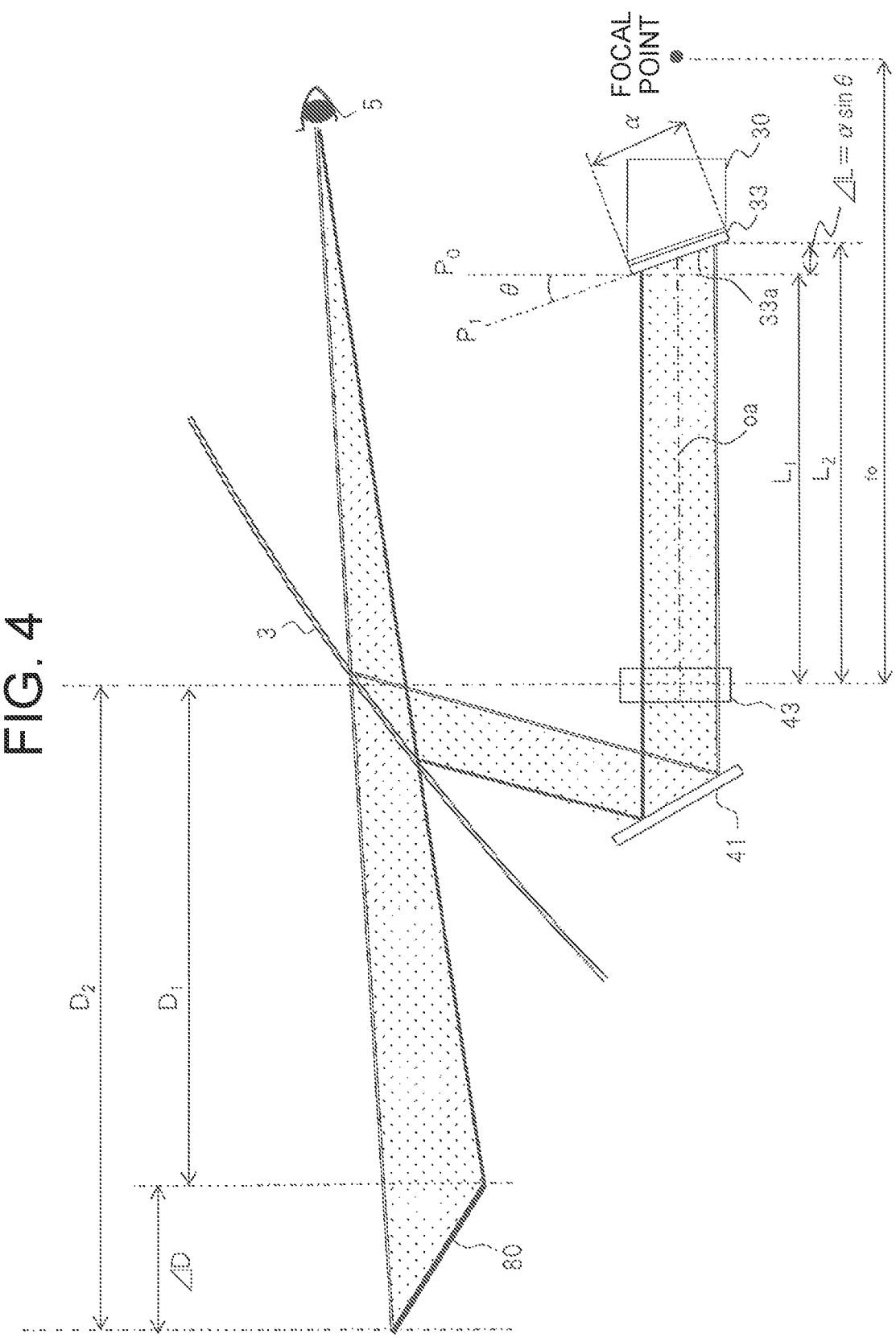

FIG. 5A

| NOMINAL | SURFACE NO. | SHAPE | CURVATURE RADIUS | INTERFACIAL DISTANCE | GLASS MATERIAL NAME | CONTENT OF DECENTERING /TILTING | DECENTERING(mm) | | | TILTING(DEGREE) | | |
|---|---|---|---|---|---|---|---|---|---|---|---|---|
| | | | | | | | X-AXIS | Y-AXIS | Z-AXIS | AROUND X-AXIS | AROUND Y-AXIS | AROUND Z-AXIS |
| VIRTUAL IMAGE PLANE | 0 | FLAT SURFACE | ∞ | 16500 | | DECENTER & RETURN | 0 | 0 | 0 | 80 | 0 | 0 |
| ENTRANCE PUPIL | 1 | FLAT SURFACE | ∞ | -680 | | | 0 | 0 | 0 | -0.7 | 0 | 0 |
| WINDSHIELD | 2 | ANAMORPHIC ASPHERICAL SURFACE | 9886 / 5531 | 0 | REFLECTIVE | DECENTER & RETURN | -340 | -1959 | -2665 | -43.7 | 0 | 0 |
| DUMMY SURFACE | 3 | FLAT SURFACE | ∞ | 353.824 | | NORMAL DECENTERING | 0 | 0 | 0 | -130.759 | -6.846 | 0 |
| MIRROR | 4 | FREE CURVED SURFACE | -710.957 | 0 | REFLECTIVE | DECENTER & RETURN | 0 | 0 | 0 | -31.016 | -12.423 | -40.712 |
| DUMMY SURFACE | 5 | FLAT SURFACE | ∞ | -217.078 | | NORMAL DECENTERING | 0 | 0 | 0 | -30.157 | -8.520 | 0 |
| MIRROR | 6 | FLAT SURFACE | ∞ | 0 | REFLECTIVE | DECENTER & RETURN | 0 | 0 | 0 | 30.289 | 2.361 | 0 |
| DUMMY SURFACE | 7 | FLAT SURFACE | ∞ | 107.745 | | NORMAL DECENTERING | 0 | 0 | 0 | 84.326 | 2.803 | 0 |
| L1 | 8 | FREE CURVED SURFACE | ∞ | 2.000 | PMMA825 | NORMAL DECENTERING | 5.091 | 0 | 0 | 2.468 | -14.293 | 0.041 |
| | 9 | FREE CURVED SURFACE | ∞ | 33.938 | | NORMAL DECENTERING | 0.499 | -7.494 | 0 | 0 | 0 | 0 |
| POLARIZATION PLATE /BASE MATERIAL | 10 | FLAT SURFACE | ∞ | 0.122 | 50.30 | | 0 | -38.333 | 0 | 0 | 0 | 0 |
| | 11 | FLAT SURFACE | ∞ | 0.600 | 52.60 | | 0 | 0 | 0 | 0 | 0 | 0 |
| | 12 | FLAT SURFACE | ∞ | 0.000 | | | 0 | 0 | 0 | 0 | 0 | 0 |
| INTERMEDIATE IMAGE | 13 | FLAT SURFACE | ∞ | 0.000 | | | 0 | 0 | 0 | 0 | 0 | 0 |

FIG. 5B

| CODE | | MIRROR SURFACE(4TH) | L1A SURFACE(8TH) | L1B SURFACE(9TH) |
|---|---|---|---|---|
| R | $1/c$ | -710.957 | ∞ | ∞ |
| K | $K$ | -1.84494 | | |
| C2 | $X$ | 4.47944E-01 | 9.96573E-02 | |
| C3 | $Y$ | -8.11952E-02 | -1.45254E-01 | |
| C4 | $X^2$ | -6.60696E-05 | -2.40241E-03 | -3.05521E-03 |
| C5 | $XY$ | -1.31218E-04 | 4.40825E-03 | -8.61075E-03 |
| C6 | $Y^2$ | 3.17340E-05 | -2.93085E-02 | -4.74723E-03 |
| C7 | $X^3$ | 7.44638E-07 | -6.79589E-05 | 2.74248E-05 |
| C8 | $X^2Y$ | 6.50020E-08 | 1.44061E-04 | -2.42243E-05 |
| C9 | $XY^2$ | 9.08521E-07 | 2.70281E-04 | -2.54718E-04 |
| C10 | $Y^3$ | -9.15880E-08 | -1.20861E-04 | 8.10810E-05 |
| C11 | $X^4$ | -7.81224E-10 | 1.52039E-06 | -7.73734E-07 |
| C12 | $X^3Y$ | 9.69936E-10 | 1.03065E-06 | 2.55001E-06 |
| C13 | $X^2Y^2$ | -1.84539E-09 | 4.64614E-06 | -5.14882E-06 |
| C14 | $XY^3$ | 9.02586E-10 | 5.48504E-06 | -4.65230E-06 |
| C15 | $Y^4$ | -8.28544E-10 | 8.34279E-06 | 2.40885E-06 |
| C16 | $X^5$ | 2.64296E-12 | -5.05676E-09 | 1.19082E-08 |
| C17 | $X^4Y$ | 1.23069E-11 | 2.30730E-08 | -4.10172E-08 |
| C18 | $X^3Y^2$ | -6.01710E-12 | 1.47699E-07 | -6.83534E-08 |
| C19 | $X^2Y^3$ | 6.56651E-12 | 1.80655E-08 | -1.31103E-07 |
| C20 | $XY^4$ | 9.58142E-13 | -1.87749E-08 | -4.45397E-08 |
| C21 | $Y^5$ | 8.54085E-13 | 2.85229E-08 | -4.93600E-08 |
| C22 | $X^6$ | 4.96247E-14 | 1.66159E-10 | 1.98402E-10 |
| C23 | $X^5Y$ | -4.98916E-14 | 8.32609E-11 | 1.55862E-09 |
| C24 | $X^4Y^2$ | 1.53392E-13 | -9.44058E-11 | 6.91783E-10 |
| C25 | $X^3Y^3$ | -1.49259E-13 | 2.41449E-09 | -7.34931E-09 |
| C26 | $X^2Y^4$ | 2.47485E-13 | -5.05905E-10 | -3.85824E-10 |
| C27 | $XY^5$ | -1.50298E-13 | -7.60455E-10 | 9.86404E-10 |
| C28 | $Y^6$ | 8.62937E-14 | -1.04670E-09 | 9.50594E-10 |
| C29 | $X^7$ | 2.38676E-16 | 8.31872E-13 | 3.37804E-13 |
| C30 | $X^6Y$ | -7.82822E-17 | 8.55385E-12 | -1.25361E-12 |
| C31 | $X^5Y^2$ | 6.05135E-16 | 7.93082E-12 | 4.82934E-11 |
| C32 | $X^4Y^3$ | 8.11933E-16 | -5.61220E-12 | 4.96131E-11 |
| C33 | $X^3Y^4$ | -2.26585E-16 | -1.41337E-11 | -1.71038E-10 |
| C34 | $X^2Y^5$ | 8.60953E-16 | 2.17831E-12 | 1.67774E-11 |
| C35 | $XY^6$ | -1.35525E-16 | 1.09378E-11 | 3.33417E-11 |
| C36 | $Y^7$ | 1.90255E-17 | 3.07852E-11 | 4.07027E-11 |
| C37 | $X^8$ | 1.92381E-19 | -1.54917E-14 | -2.85672E-14 |
| C38 | $X^7Y$ | 2.84866E-18 | 6.18893E-14 | -1.21848E-14 |
| C39 | $X^6Y^2$ | -1.11954E-18 | 3.01832E-13 | -7.62260E-14 |
| C40 | $X^5Y^3$ | 1.49781E-18 | 1.01833E-13 | 3.67990E-13 |
| C41 | $X^4Y^4$ | 8.04207E-18 | -3.05356E-13 | 4.79801E-13 |
| C42 | $X^3Y^5$ | -2.88940E-19 | -6.65397E-13 | -1.25943E-12 |
| C43 | $X^2Y^6$ | -4.50379E-19 | 3.25713E-13 | 1.44938E-13 |
| C44 | $XY^7$ | 9.74405E-19 | 2.71427E-13 | 2.82116E-13 |
| C45 | $Y^8$ | -2.23786E-18 | 7.54689E-13 | 2.87868E-13 |
| C46 | $X^9$ | 2.07731E-21 | 5.21635E-17 | |
| C47 | $X^8Y$ | -5.58768E-21 | -9.71550E-17 | |
| C48 | $X^7Y^2$ | 1.52929E-20 | 1.25980E-15 | |
| C49 | $X^6Y^3$ | 6.58719E-22 | 4.03298E-15 | |
| C50 | $X^5Y^4$ | -1.64242E-20 | 7.85770E-16 | |
| C51 | $X^4Y^5$ | 1.02916E-20 | -3.89827E-15 | |
| C52 | $X^3Y^6$ | 1.89557E-20 | -4.30406E-15 | |
| C53 | $X^2Y^7$ | -4.84402E-21 | 2.99505E-15 | |
| C54 | $XY^8$ | -2.03005E-20 | 1.31212E-15 | |
| C55 | $Y^9$ | 2.70007E-21 | 3.88477E-15 | |

HEAD-UP DISPLAY DEVICE

TECHNICAL FIELD

The present invention relates to a head-up display device.

BACKGROUND ART

In a vehicle such as an automobile for example, information such as a vehicle speed and an engine speed is normally displayed on an instrument panel inside a dashboard. Also, the screen of car navigation and the like is displayed on a display incorporated in the dashboard or installed on the dashboard. Since it is required for a driver to largely move the visual line when the driver visually contacts the information, head-up display devices are known a technology for reducing the moving amount of the visual line, whereas such device (hereinafter, being described as "HUD") projects and displays information such as a vehicle speed and information such as an instruction related to car navigation on the windshield and the like.

As a technology related to a HUD, such HUD for example has been disclosed in Patent Literature 1 that "The data for head-up display displayed image from an operation parameter detection device is input to a display control circuit. A display body is disposed generally horizontally with display boards being arranged at vertical intervals from each other, and the display boards are transparent excluding their display areas. The display control circuit controls each display board to display the displayed image on the plural display boards. A backlight light source is arranged below the display boards, the light of the backlight light source reaches the upper display board, and the emission light from each display board passes through a louver and is made to incident on a combiner. By switching the display board displaying information, the distance from the driver's eye position to the position where the virtual image is displayed can be made variable without using a movable mechanism (excerption of the abstract)".

CITATION LIST

Patent Literature

PATENT LITERATURE 1: JP-A No. 2004-168230

SUMMARY OF INVENTION

Technical Problem

In the HUD described in Patent Literature 1, plural display boards are disposed along the emission direction of the emission light. Therefore, in order to prevent the displayed image displayed on a display board disposed on the backlight light source side from being blocked by the display board disposed on the opposite side of the backlight light source side namely the louver side, each display board is provided with a display area and a transparent area. Also, three kinds of the display boards where the positions of the transparent area and the display area are shifted so that the display areas do not overlap each other in the emission direction are used as one set, it is required to adjust and dispose the positions of the transparent area and the display area of the three display boards along the traveling direction of the emission light, and therefore there is a fact that manufacturing of the HUD incurs time and effort.

Therefore, the object of the present invention is to provide a head-up display device that improves the time and effort incurred in manufacturing a HUD that displays virtual images having different virtual image distances.

Solution to Problem

In order to solve the problem described above, the present invention has configurations as described in the claims. As an aspect of the present invention, the present invention is a head-up display device displaying a virtual image for a driver, including an image display device that includes a light source and a display element and forms an image on the display element, a virtual image optical system that displays a virtual image related to the image in front of a vehicle by reflecting image light including the image emitted from the image display device by a projection target member, and a housing that stores the virtual image optical system, in which the housing includes an aperture through which the image light is emitted, the virtual image optical system includes a lens unit and a free curved surface mirror disposed along the emission direction of the image light in this order from a position close to an emission surface of the image light in the display element, the display element is disposed with a tilting attitude with respect to an optical axis of the lens unit with an end on the aperture side in the emission surface being made close to an incident surface in the lens unit and with an end on the opposite side of the aperture in the emission surface being made apart from the incident surface in the lens unit, and the lens unit has an optical characteristic of optically enlarging an optical path length difference that is the difference between a first optical path length from the end on the aperture side to the incident surface of the lens unit and a second optical path length from the end on the opposite side of the aperture side to the incident surface of the lens unit.

Advantageous Effect of Invention

According to the present invention, it is possible to provide a head-up display device that improves the time and effort incurred in manufacturing a HUD that displays virtual images having different virtual image distances. Also, objects, configurations, and effects other than those described above will be clarified in embodiments described below.

BRIEF DESCRIPTION OF DRAWINGS

FIG. 4 is a drawing that shows the tilting attitude of a display element, the optical path length difference and the virtual image distance difference.

FIG. 5A is a drawing that shows an example of a lens unit used in the present embodiment.

FIG. 5B is a drawing that shows an example of a lens unit used in the present embodiment.

DESCRIPTION OF EMBODIMENTS

Figure 1:
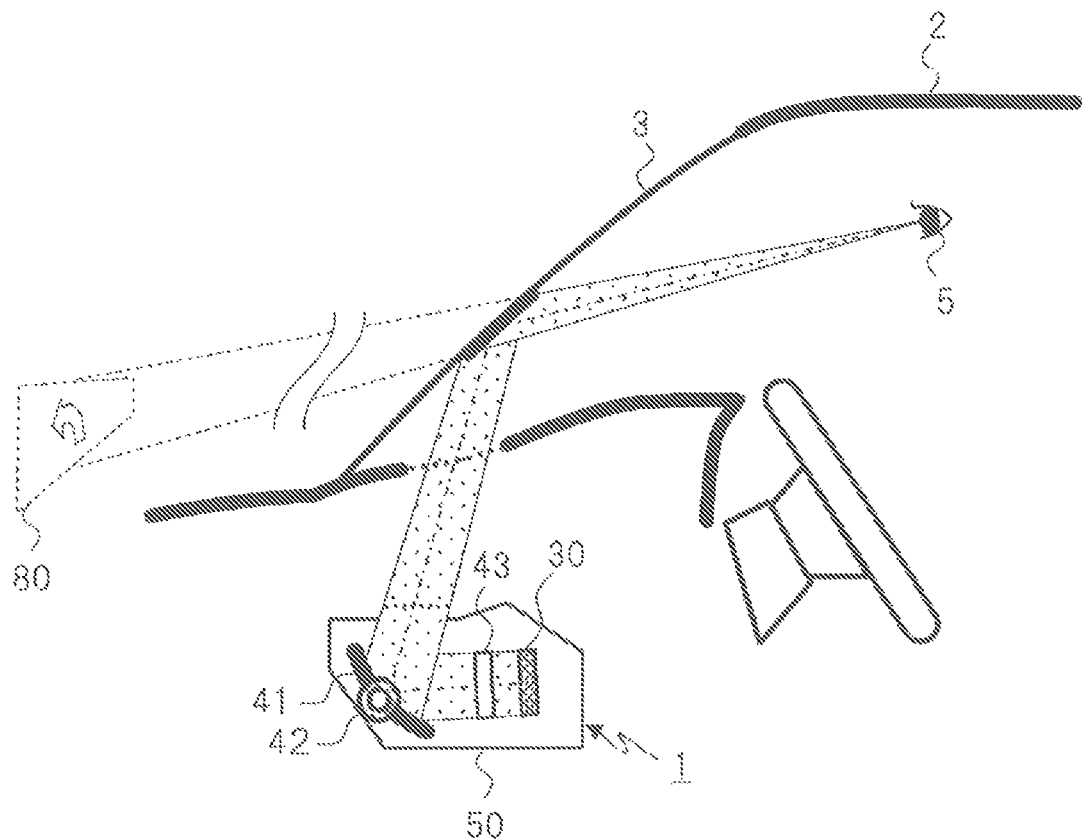
FIG. 1 is a schematic configuration drawing of a head-up display device according to the present embodiment.

Hereinafter, embodiments of the present invention will be explained in detail based on the drawings. Also, in all drawings for explaining the embodiments, a same member is marked with a same reference sign in principle, and repeated explanation for it will be omitted. Meanwhile, there is a case that a portion explained with a reference sign in a drawing is referred to with the same reference sign in explanation of another drawing although repeated illustration thereof is omitted. Further, although each embodiment shown below is explained exemplifying a case of installing a head-up display device (HUD) on a vehicle such as an automobile, the present invention is also applicable to other conveyances such as a train and an aircraft etc. Furthermore, the present invention is also applicable to a HUD for uses other than a conveyance.

First Embodiment

In a first embodiment an image display device including a display element such as an LCD panel and a lens unit are used, the display element is held at a tilting attitude, and virtual images having different virtual image distances are displayed utilizing the relationship between the magnification of the lens unit and the disposal position of the display element and the lens unit. Hereinafter, explanation will be made referring to the drawings.

FIG. 1 is a schematic configuration drawing of a head-up display device according to the present embodiment. A HUD device 1 reflects image light including an image displayed by an image display device 30 disposed within an exterior housing 50 by a free curved surface mirror 41, and projects the image light on a windshield 3 of a vehicle 2. The image light projected on the windshield 3 is made to be incident to the eyes of a driver 5, and the driver thereby visually contacts a virtual image 80 in front of the vehicle 2. The free curved surface mirror 41 rotates by a mirror drive section 42. Thereby, the free curved surface mirror 41 changes the angle at which the image light is reflected towards the windshield 3.

Here, a projection target member is not limited to the windshield 3, but can be another member such as a combiner as far as it is a member to which the image light is projected. Also, in the present embodiment, as the image display device 30, a projector having a backlight and an LCD (Liquid Crystal Display) 30 are used. A VFD (Vacuum Fluorescent Display; used in the second embodiment described below) of a self-luminous type and the like may be applicable. A projection device displaying an image on a screen may be also applicable. Such screen may be configured for example by a micro lens array in which micro lenses are two-dimensionally arranged.

Between the free curved surface mirror 41 and the image display device 30, a lens unit 43 is provided which is for adjusting the optical distance between the free curved surface mirror 41 and the image display device 30. Therefore, the lens unit 43 and the free curved surface mirror 41 are disposed in order of proximity from the image display device 30 side along the emission direction of the image light from the image display device 30 to form a virtual image optical system, and are accommodated inside the exterior housing 50.

Figure 2A:
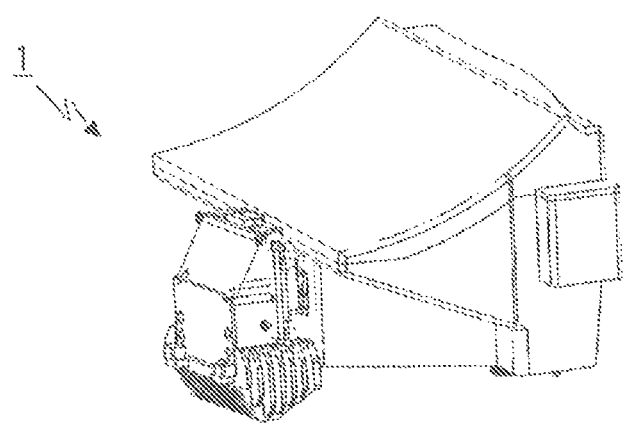
FIG. 2A is a perspective view that shows an external appearance around a housing of an HUD.
Figure 2B:
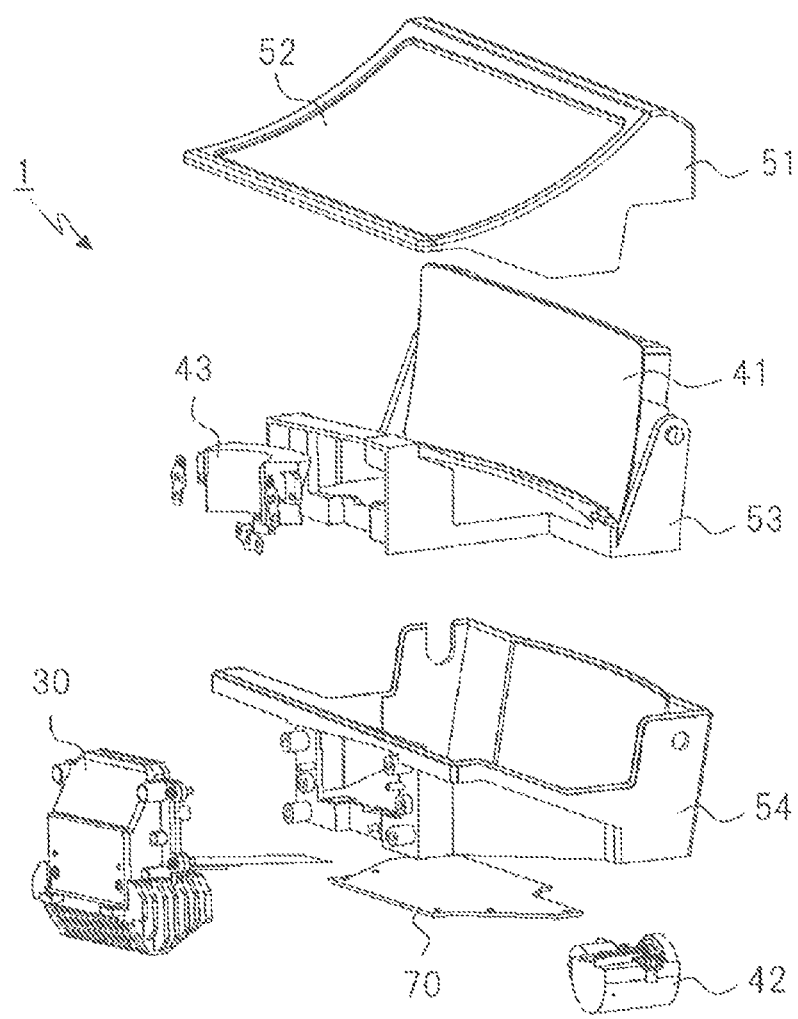
FIG. 2B is a perspective view that shows a state of disintegrating the HUD shown in FIG. 2A into each component.

FIG. 2A and FIG. 2B are drawings that show a general layout on an example of an implementation of a head-up display device that is an embodiment of the present invention. FIG. 2A is a perspective view that shows an example of an external appearance around the exterior housing 50 of the HUD 1. Also, FIG. 2B is a perspective view that shows the HUD 1 shown in FIG. 2A disassembled into its components.

As shown in FIG. 2B, the HUD 1 has such configuration that an optical component holding member 53 is accommodated in an exterior case 54, and the upper part is covered by an exterior lid section 51. Each member of the exterior case 54 and the exterior lid section 51 configures the exterior housing 50 in the HUD 1 shown in FIG. 1. Also, the image display device 30 is attached to an aperture of the exterior case 54.

The exterior lid section 51 has an aperture for emitting the image light towards the windshield 3, and the aperture is covered by a glare trap 52.

The optical component holding member 53 is a member that holds the free curved surface mirror 41 and the lens unit 43 in the HUD 1 shown in FIG. 1.

To the exterior case 54, other components such as a main base plate 70 and the mirror drive section 42 may be attached, wherein the main base plate 70 being mounted with a control section that controls operation of an LED light source 31a and a backlight and the like described below and the mirror drive section 42 including a motor and the like for changing the inclination angle of the free curved surface mirror 41. In the present embodiment, an attaching/detaching mechanism such as a screw hole and the like allowing attaching/detaching of the image display device 30 and an aperture and the like for entering of the image light are further formed.

In the present embodiment, the image display device 30 is modularized, and is configured to allow it to be integrally attached/detached to the exterior case 54 by screws and the like. Thereby, for example, only the image display device 30 can be replaced without detaching or disassembling the HUD 1 itself. Also, by attaching the image display device 30 outside the exterior housing 50 of the HUD 1, the heat radiation performance can be improved and an effect of reducing failure and deterioration due to heat can also be obtained.

Figure 3:
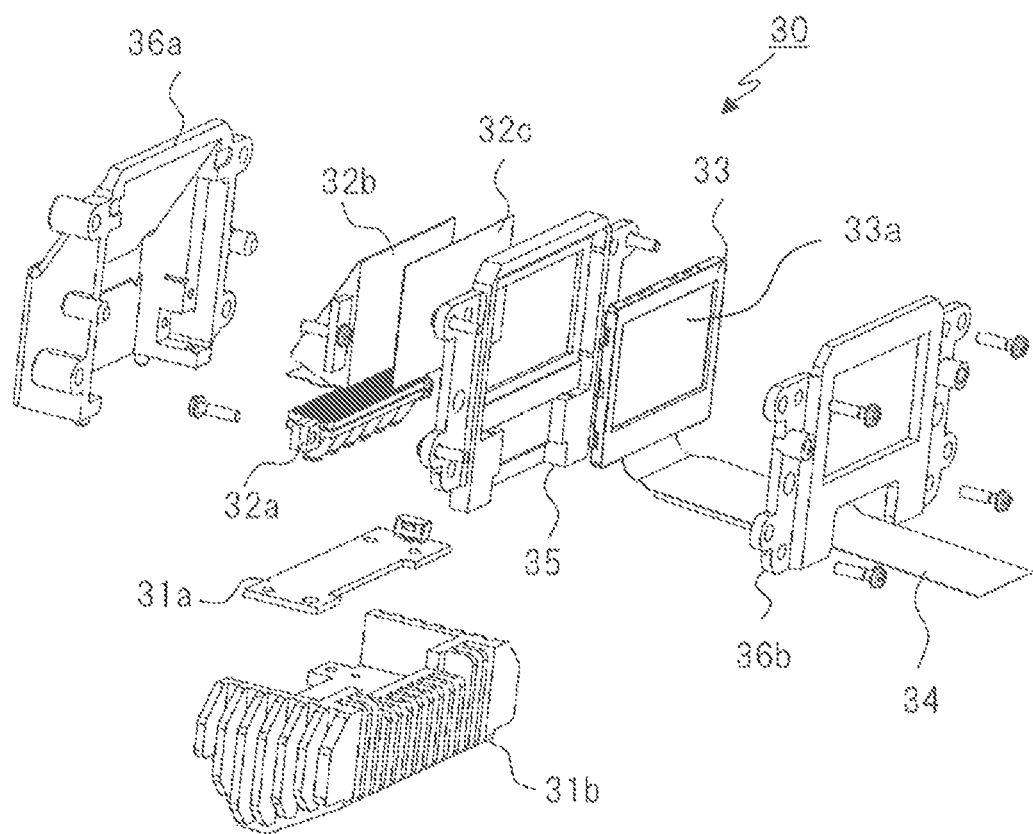
FIG. 3 is a drawing that shows a general outline on an example of an implementation of a image display device according to the present embodiment.

FIG. 3 is a drawing that schematically shows an example of an implementation of the image display device 30. Here, image a perspective view shows a state in which the modularized image display device 30 is disassembled into its components. The image display device 30 displays an image by that a display element 33 such as an LCD panel modulates light from the backlight based on an image signal inputted from the main base plate 70 through a flexible cable 34. The image having been displayed is outputted to a virtual image optical system (the lens unit 43 and the free curved surface mirror 41 in FIG. 2 in the present embodiment) through the aperture of the exterior case 54 in FIG. 2, and a virtual image is generated which the driver 5 can visually contact.

For a light source element in the backlight, for example, a relatively inexpensive and highly reliable LED (Light Emitting Diode) light source 31a is used as a solid-state light source. The LED light source 31a is of a surface emission type in order to ensure a high output. In the example of FIG. 3, the LED light source 31a is mounted as an LED base plate. In this case, for example, the utilization efficiency of the divergent light is improved using such technical devisal as described below.

The luminous efficiency of the LED with respect to input power is approximately 20 to 30% which differs according to the emission color, and the rest is converted to heat. Therefore, in frame 35 to which the LED light source 31a is attached, fins (heat sink 31b) for heat radiation formed of an element with high thermal conductivity (a metal element such as an aluminum element for example) are arranged to dissipate the heat to the outside.

In order to efficiently guide the divergent light from the LED light source 31a to the display element 33, in the example of FIG. 3, a light guide body 32b and a diffusion plate 32c are used. In this case, in order to prevent attachment of dust etc., it is preferable to cover the whole light guide body 32b, the diffusion plate 32c, the display element 33 and the like by the exterior members 36a, 36b for example and to modularize as the image display device 30.

Also, in the example of FIG. 3, in order to take in the divergent light from the LED light source 31a and to make the divergent light parallel light, a plurality of light funnels 32a formed of a collimate lens or the like provided. An aperture that takes in the divergent light from the LED light source 31a in each light funnel 32a is, for example, a flat surface and is optically connected to the LED light source 31a with a medium being inserted between the LED light source 31a, or has a convex shape with a light collecting effect. Thereby, the divergent light is made into as much as parallel light as possible, and the incident angle of the light entering the interface of the light funnel 32a is reduced. As a result, because the diversion angle after passing through the light funnel 32a can be reduced, the light of the light source heading to the display element 33 after being reflected by the light guide body 32b can be easily controlled.

In order to further improve the utilization efficiency of the divergent light from the LED light source 31a, polarization conversion using a PBS (Polarizing Beam Splitter) is executed in the joining part of the light funnel 32a and the light guide body 32b, and the divergent light is converted to a desired polarization direction. Thereby, the efficiency of the incident light to the display element 33 can be improved. As described above, when the polarization direction of the light of the light source is aligned, it is preferable to use material with less birefringence as the material of the light guide body 32b. Thereby, when the divergent light passes through the display element 33 while the polarization direction is rotated, for example, it is possible to suppress occurrence of problems such as coloration at the time of displaying black color.

FIG. 4 is a drawing that shows the tilting attitude of the display element, the optical path length difference, and the virtual image distance difference. As shown in FIG. 4, an emission surface 33a of the image light in the display element 33 of the image display device 30 is disposed with a tilting attitude $P_1$ of tilting from a reference position $P_0$ in such direction that the upper end of the emission surface 33a comes closer to the lens unit 43 side and the lower end comes apart from the lens unit 43 side, the position where the emission surface 33a becomes perpendicular to an optical axis of the lens unit 43 being made to be the reference position $P_0$. As a result, when the depression angle of the emission surface 33a with respect to the reference position $P_0$ is made θ, the optical path length difference ΔL between a first optical path length L1 from the upper end of the emission surface 33a (equivalent to an end on the aperture side of the exterior lid section 51 in the emission surface 33a) to the lens unit 43 and a second optical path length L2 from the lower end (equivalent to an end on the opposite side of the aperture of the exterior lid section 51 in the emission surface 33a) to the lens unit 43 can be expressed by formula (1) below.

[formula 1]

$$\Delta L = L2 - L1 \quad (1)$$
$$= [(L1 + (\alpha/2)\sin\theta)] - [L1 - (\alpha/2)\sin\theta]$$
$$= \alpha\sin\theta$$

where α is the length of the left side or right side of the emission surface 33a.

Meanwhile, the first optical path length L1 from the lens unit 43 to the upper end of the emission surface 33a and the second optical path length L2 from the lens unit 43 to the lower end of the emission surface 33a are shorter than the focal point distance of the lens unit 43. In that case, the upper end and the lower end of the virtual image 80 are displayed at respective positions of a first virtual image distance D1 and a second virtual image distance D2 from the lens unit 43 according to formulas (2) and (3) with a magnification m=D1/L1=D2/L2. Also, the magnification m is equal to the size m of the virtual image 80 when the size of the display image on the emission surface 33a is made 1.

[formula 2]

$$1/L1 + 1/D1 = 1/f \quad (2)$$

[formula 3]

$$1/L2 + 1/D2 = 1/f \quad (3)$$

From formula (2) and formula (3),

[formula 4]

$$1/L1 + 1/D1 = 1/L2 + 1/D2 \quad (4)$$
$$1/D1 - 1/D2 = 1/L2 - 1/L1$$
$$(D2 - D1)/(D1 \cdot D2) = (L2 - L1)/(L1 \cdot L2)$$
$$\Delta D = \Delta L(D1 \cdot D2)/(L1 \cdot L2)$$
$$= \Delta L \cdot m^2$$

When the virtual image distance difference $\Delta D$ between the upper end and the lower end of the virtual image 80 is given as a desired value in formula (4), because $\Delta L$ is a value determined mechanically from the structure of the HUD 1, the optical characteristic of the lens unit 43 only has to include the magnification m that satisfies (4). Also, by disposing the display element 33 at a position shorter than the focal point distance fo of the lens unit 43, the virtual image 80 having the virtual image distance difference $\Delta D$ can be displayed. Also, in the actual implementation, even when the virtual image distance difference $\Delta D$ is not strictly an equal value to formula (4), the virtual image distance difference $\Delta D$ only has to be in an allowable range where the virtual image distance difference $\Delta D$ can be deemed to be equal to the optical path length difference enlarged by the lens unit 43.

FIG. 5A and FIG. 5B are drawings that show an example of the lens unit used in the present embodiment. The lens unit 43 may be a single lens, and may be a so-called set lens that is obtained by combining a plurality of lenses. In general, when a lens is not used, a trapezoidal distortion occurs in the image of the HUD because of the inclination and the like of the windshield 3. Therefore, by tilting the display element 33 so that the trapezoidal distortion generated in the windshield 3 becomes a rectangle, the distance from the upper end of the display element 33 to the windshield 3 and the distance from the lower end of the display element 33 to the windshield 3 are changed, and thereby, improvement of correction of the trapezoidal distortion caused by the inclination of the windshield 3 can be effected to some extent. However, when the display element 33 is tilted too much, deterioration of the image quality caused by deterioration of the contrast of the image etc. occurs, and therefore there is a limit in the distortion correction effect obtained by tilting of the display element 33.

Meanwhile, in the present embodiment, by incorporating a distortion correction lens to the lens unit 43 having a magnification that achieves a desired virtual image distance difference, a virtual image is displayed with the desired virtual image distance difference while improving the correction effect of the trapezoidal distortion. As the lens unit 43 used in the present embodiment, such distortion correction lens having a free curved surface shape whose surface shape is defined as a function of the absolute coordinates (x, y) from the optical axis is used. The free curved surface shape is expressed by the following formula (5).

[formula 5]

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n) \quad (5)$$

$$j = [(m+n)^2 + m + 3n]/2 + 1.$$

By using the distortion correction lens described above, the optical path length difference structurally determined from the emission surface 33a of the display element 33 to the incident surface of the lens unit 43 is optically corrected to the optical path length difference corresponding to the virtual image distance difference while reducing deterioration of the image forming performance of the virtual image which is caused by a difference in the curvature radius of the windshield 3.

According to the present embodiment, it is possible to provide a HUD that holds the display element at a tilting attitude and displays virtual images with different virtual image distances based on the relationship of the magnification of the lens unit and the disposal position of the display element and the lens unit. In this configuration, because the display element and the lens unit can be appropriately as general-purpose products, procurement of components becomes easier compared to a case of using specialized components, and reduction of the manufacturing cost can be expected.

Second Embodiment

In the second embodiment, instead of the image display device of the first embodiment, a self-luminous film irradiation device is used which includes a plurality of projectors that irradiate light having different frequencies and a plurality of self-luminous films that react to different frequencies, and respective self-luminous films are disposed at intervals along the emission direction of irradiation light irradiated from the projector. Thereby, in each of the emission light having different frequencies, an optical path length difference equivalent to an optical path length according to the interval between the self-luminous films occurs. Therefore, in the second embodiment, virtual images having different virtual image distance differences are displayed using this optical path length difference. Hereinafter, explanation will be made referring to the drawings.

Figure 6A:
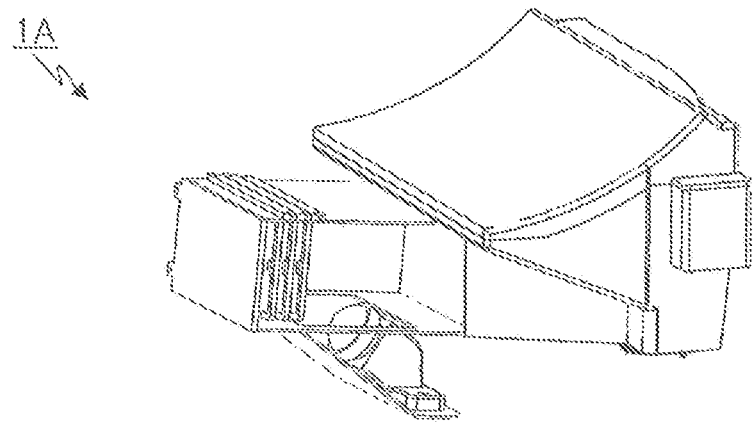
FIG. 6A is a perspective view that shows an example of an external appearance around an exterior housing of the HUD.

FIG. 6A is a perspective view that shows an example of an external appearance around the exterior housing 50 of a HUD 1A. Also, FIG. 6B is a perspective view that shows the HUD 1A shown in FIG. 6A in state of being disassembled into its components.

Figure 6B:
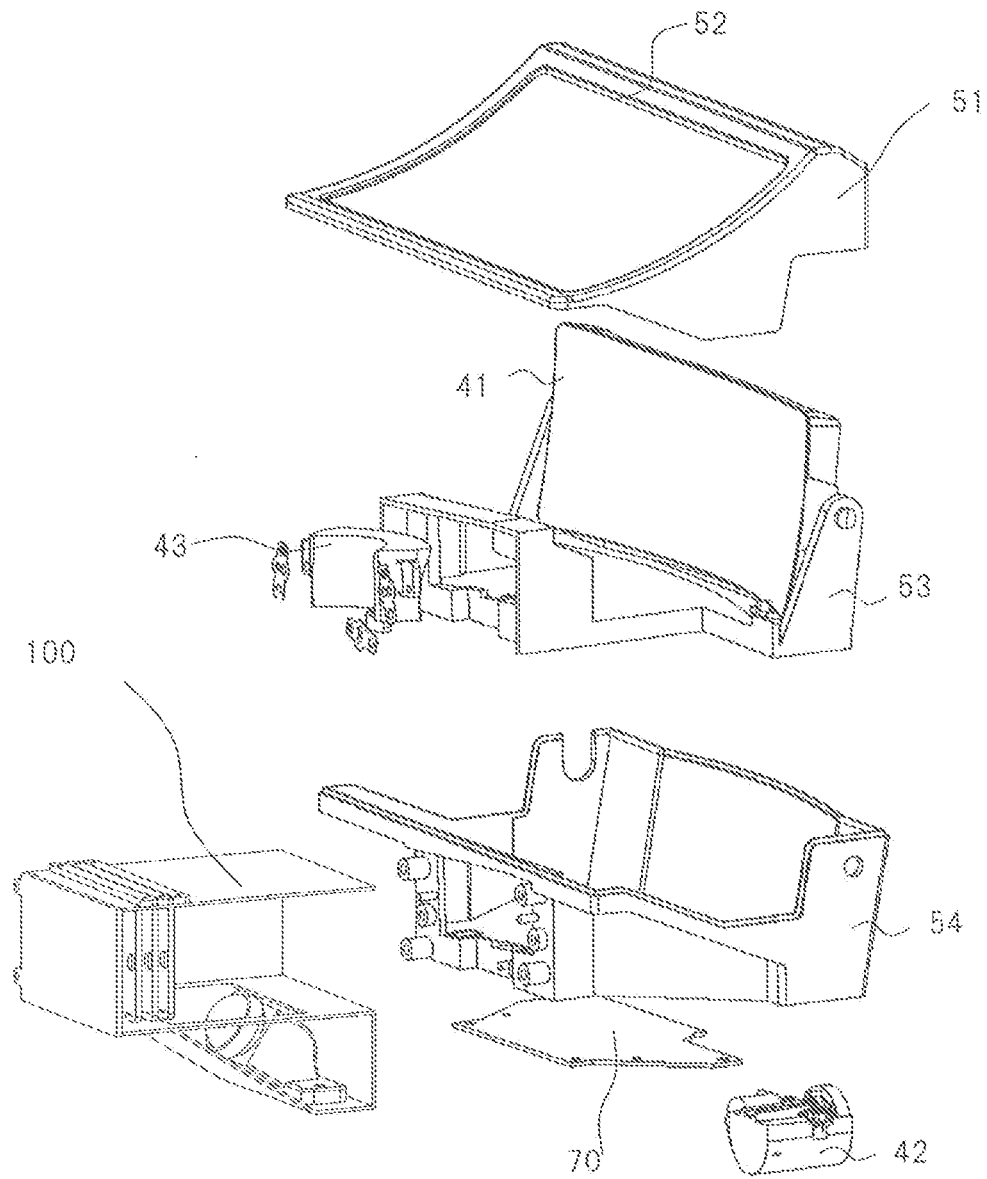
FIG. 6B is a perspective view that shows a state of disintegrating the HUD shown in FIG. 6A into each component.

As shown in FIG. 6A and FIG. 6B, similarly to the HUD 1 according to the first embodiment, the HUD 1A has such configuration that the optical component holding member 53 is accommodated in the exterior case 54, and the upper part is covered by the exterior lid section 51. Also, a self-luminous film irradiation device 100 is attached to an aperture of the exterior case 54 instead of the image display device 30 of the first embodiment.

Figure 7A:
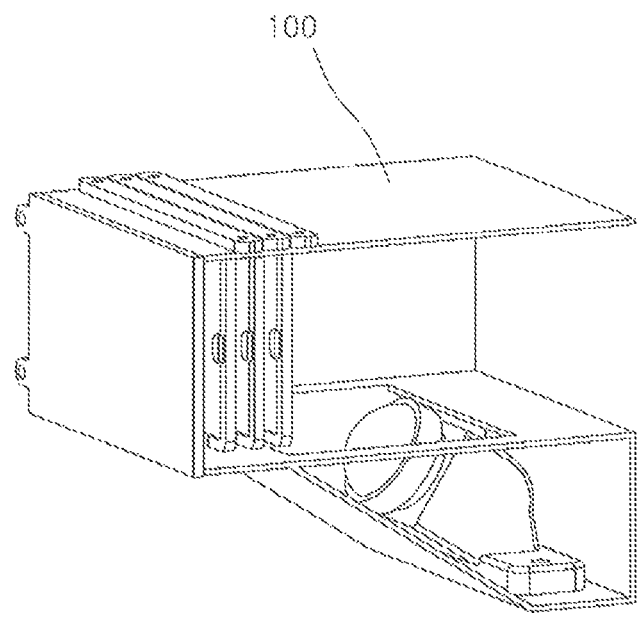
FIG. 7A is a perspective view that shows an example of an external appearance of a self-luminous film irradiation device according to a second embodiment.
Figure 7B:
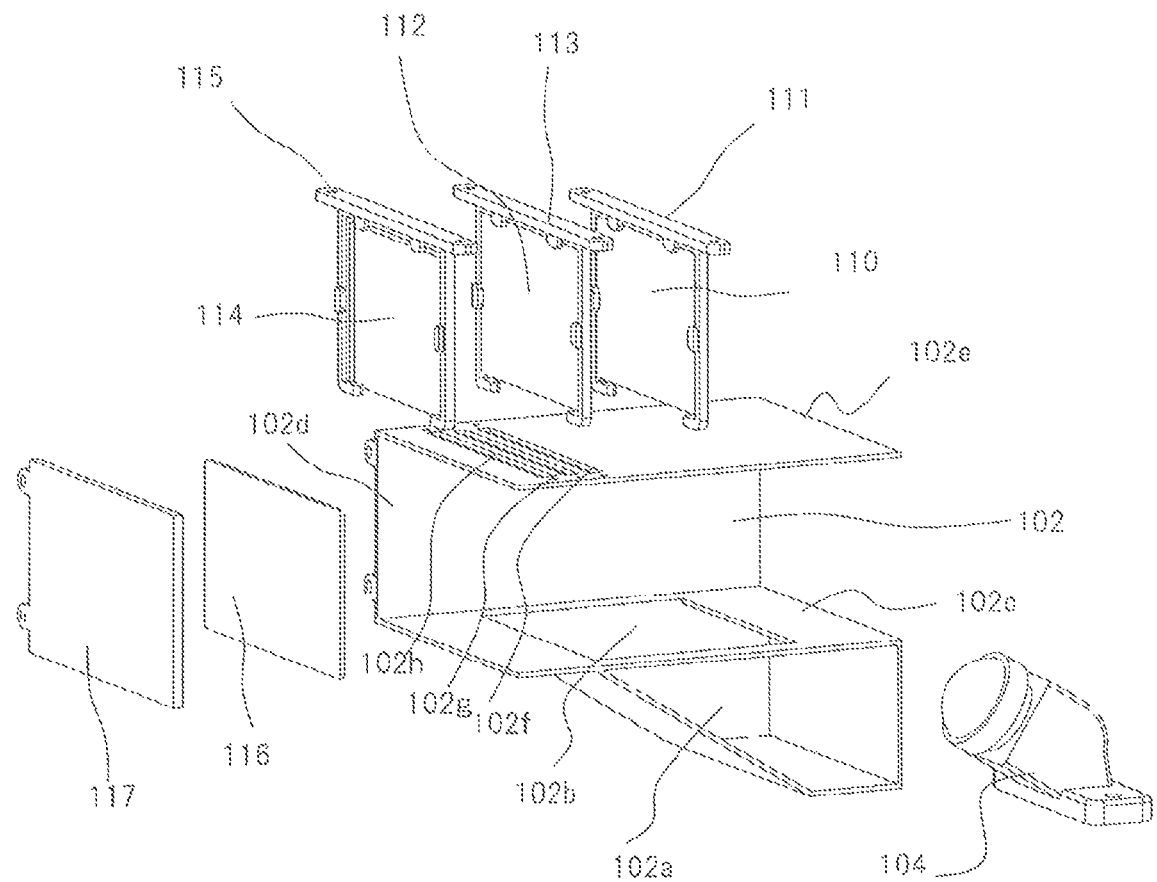
FIG. 7B is a perspective view that shows a state of disintegrating each component of the self-luminous film irradiation device according to the second embodiment.

FIG. 7A is a perspective view that shows an example of an external appearance of the self-luminous film irradiation device 100 according to the second embodiment. FIG. 7B is a perspective view that shows the self-luminous film irradiation device 100 according to the second embodiment in state of being disassembled into its components.

As shown in FIG. 7A and FIG. 7B, the self-luminous film irradiation device 100 includes a self-luminous film irradiation device housing (will be hereinafter abbreviated as "housing") 102 and a projector 104. Also, the self-luminous film irradiation device 100 is configured to dispose, on the optical path of the image light including the image information irradiated from the projector 104 in order from the projector 104 side, a first self-luminous film 110 that reacts to light of a first frequency and emits first image light and a first self-luminous film holder 111 that holds the first self-luminous film 110, a second self-luminous film 112 that reacts to light of a second frequency and emits second image light and a second self-luminous film holder 113 that holds the second self-luminous film 112, a third self-luminous film 114 that reacts to light of a third frequency and emits third image light and a third self-luminous film holder 115 that holds the third self-luminous film 114, and a black screen 116 and a screen holder 117 that holds the black screen 116.

The housing 102 includes a projector storage section 102a that accommodates the projector 104, a middle plate 102c that includes an aperture 102b through which the image light of the projector 104 transmits, the projector 104 being accommodate in the projector storage section 102a, a side plate 102d that covers one side surface of the projector storage section 102a and is erected toward the opposite side of the projector storage section 102a with reference to the middle plate 102c, and a ceiling plate 102e that is connected to an end on the opposite side of the projector storage section 102a in the side plate 102d and faces the middle plate 102c. In the ceiling plate 102e, three slits 102f, 102g, 102h are arranged at intervals along the traveling direction of the image light. When each of the first self-luminous film holder 111, the second self-luminous film holder 113, and the third self-luminous film holder 115 are inserted to each slit 102f, 102g, 102h, the first self-luminous film holder 111, the second self-luminous film holder 113, and the third self-luminous film holder 115 are held at intervals. To which of the slits 102f, 102g, 102h each of the first self-luminous film holder 111, the second self-luminous film holder 113, and the third self-luminous film holder 115 is to be inserted may be changed appropriately. When the first self-luminous film holder 111, the second self-luminous film holder 113, and the third self-luminous film holder 115 are inserted to each slit 102f, 102g, 102h and the projector 104 is stored in the projector storage section 102a, the first self-luminous film 110, the second self-luminous film 112, and the third self-luminous film 114 are disposed within the irradiation range of the image light irradiated from the projector 104, and each of the first self-luminous film 110, the second self-luminous film 112, and the third self-luminous film 114 receives the image light of the first frequency, the second frequency, and the third frequency and emits light.

The first frequency, the second frequency, and the third frequency described above may correspond to each color of R, G, B for example.

The image light emitted from the projector 104 transmits the aperture 102b, and reaches the first self-luminous film 110, the second self-luminous film 112, and the third self-luminous film 114. When image light included in the emitted image light reaches the first self-luminous film 110, the first self-luminous film 110 reacts to the first frequency component out of the image light, and emits first frequency image light that includes image information of the first frequency component. In a similar manner, when the image light reaches the second self-luminous film 112 and the third self-luminous film 114, each of the second self-luminous film 112 and the third self-luminous film 114 reacts to each of the second frequency component and the third frequency component out of the image light, and emits second frequency image light that includes image information of the second frequency component and third frequency image light that includes image information of the third frequency component.

Figure 8:
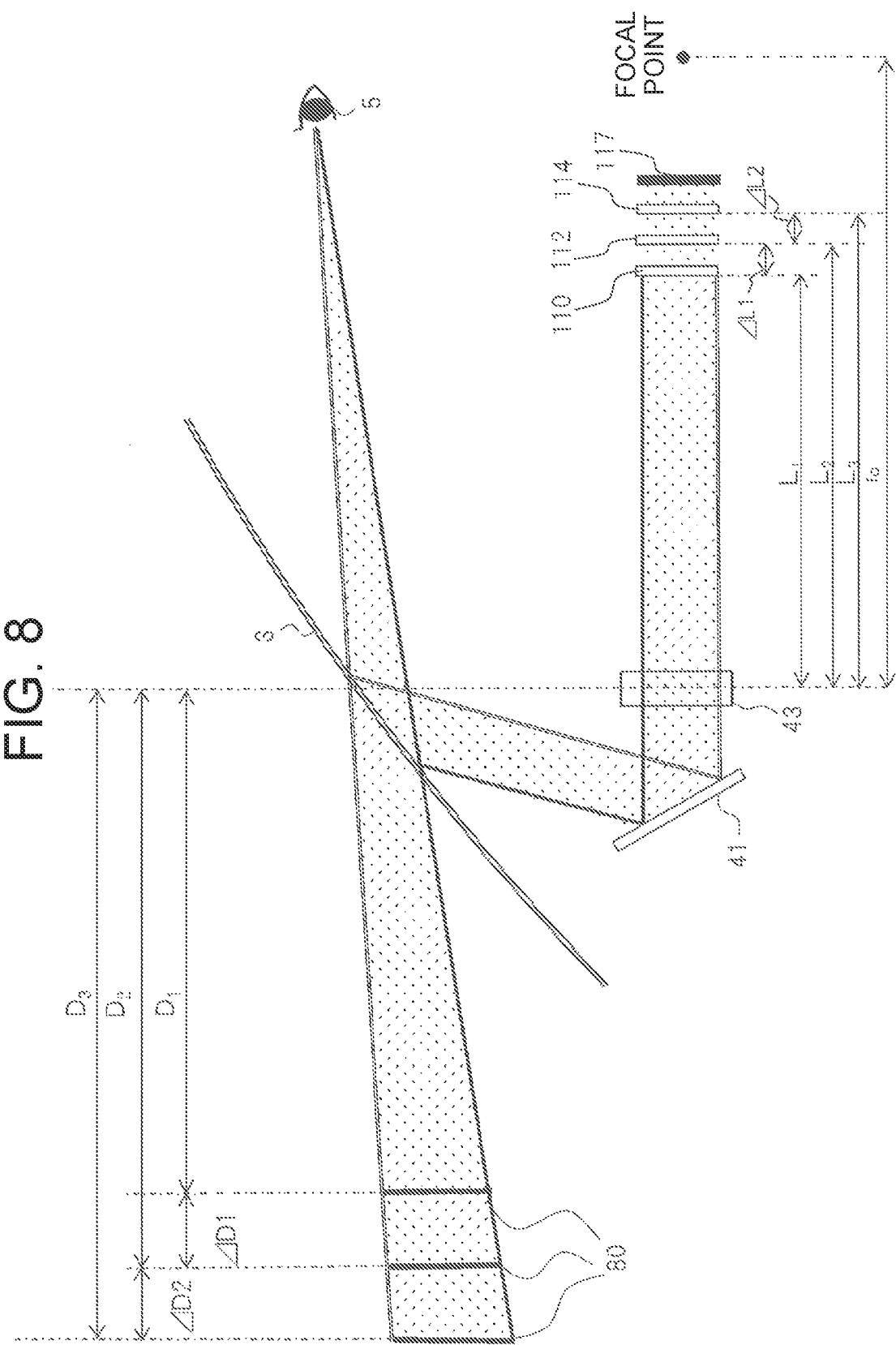
FIG. 8 is a drawing that shows the virtual image distance difference in the second embodiment.

FIG. 8 is a drawing that shows the virtual image distance difference in the second embodiment. As shown in FIG. 8, each of the first frequency image light, the second frequency image light, and the third frequency image light is made to be incident on the lens unit 43. Here, the first optical path length L1 of the first frequency image light is the distance from the first self-luminous film 110 to the lens unit 43. In a similar manner, the second optical path length L2 of the second frequency image light is the distance from the second self-luminous film 112 to the lens unit 43. Also, the third optical path length L3 of the third frequency image light is the distance from the third self-luminous film 114 to the lens unit 43. The optical path length difference $\Delta L1$ between the first optical path length L1 and the second optical path length L2 and the optical path length difference $\Delta L2$ between the second optical path length L2 and the third optical path length L3 occur from the interval between the adjacent slits 102f, 102g, and 102h. Further, although FIG. 8 illustrates an example where the slit intervals are arranged generally equally and the optical path length difference $\Delta L1$ and the optical path length difference $\Delta L2$ are generally equal, it is also possible to differentiate the interval of the slits 102f and 102g and the interval of the slits 102g and 102h and to differentiate the optical path length difference $\Delta L1$ and the optical path length difference $\Delta L2$.

When the formulas (2), (3), and (4) described above are applied to the example of FIG. 8, a first virtual image (a red color image for example) by the first frequency image light, a second virtual image (a green color image for example) by the second frequency image light, and a third virtual image (a blue color image for example) by the third frequency image light are displayed with the virtual image distance difference obtained by multiplying the square of the magnification of the lens unit 43 to each of the optical path length differences $\Delta L1$ and $\Delta L2$. Therefore, as seen from the driver 5, the first virtual image is displayed closest, the second virtual image is displayed in the middle, and the third virtual image is displayed farthest.

According to the present embodiment, the virtual images having different virtual image distance differences can be displayed similarly to the first embodiment.

Further, in the first embodiment, although the optical path length difference is formed by holding the emission surface 33a with the tilting attitude of being inclined by the tilting angle θ, in order to secure contrast of the image quality, the range where the tilting angle θ can be obtained is limited. Meanwhile, in the present embodiment, because the optical path length difference of the first optical path length L1, the second optical path length L2, and the third optical path length L3 is formed by the interval of the slits 102f, 102g, and 102h arranged in the housing 102 of the self-luminous film irradiation device 100, when the slit interval is enlarged, a larger optical path length difference can be formed, and a virtual image distance difference larger than that of the first embodiment can be achieved.

Third Embodiment

The third embodiment is an embodiment in which a folding mirror is disposed between the image display device and the lens unit. A first optical path that is parallel to the lens optical axis and a second optical path image which is reflected by the folding mirror to divert the image light and then enter the lens unit are formed. The second optical path is an optical path longer than the first optical path, and an optical path length difference occurs between the first optical path and the second optical path. In the present embodiment, virtual images having a virtual image distance difference are displayed using this optical path length difference.

Figure 9A:
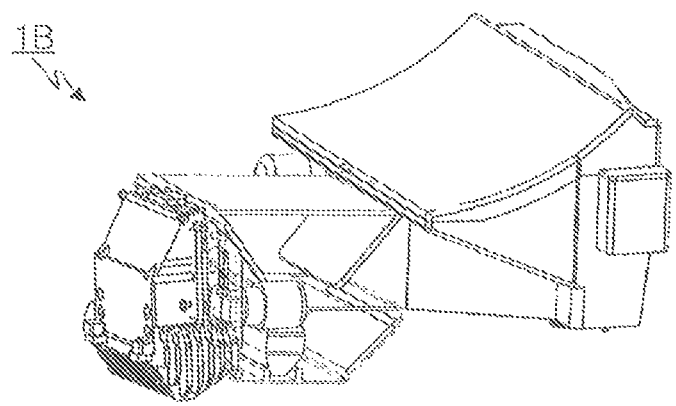
FIG. 9A is a perspective view that shows an example of an external appearance around an exterior housing of a HUD.

FIG. 9A is a perspective view that shows an example of an external appearance around the exterior housing 50 of a HUD 1B. Also, FIG. 9B is a perspective view of the HUD 1A shown in FIG. 9A being disassembled into its components.

Figure 9B:
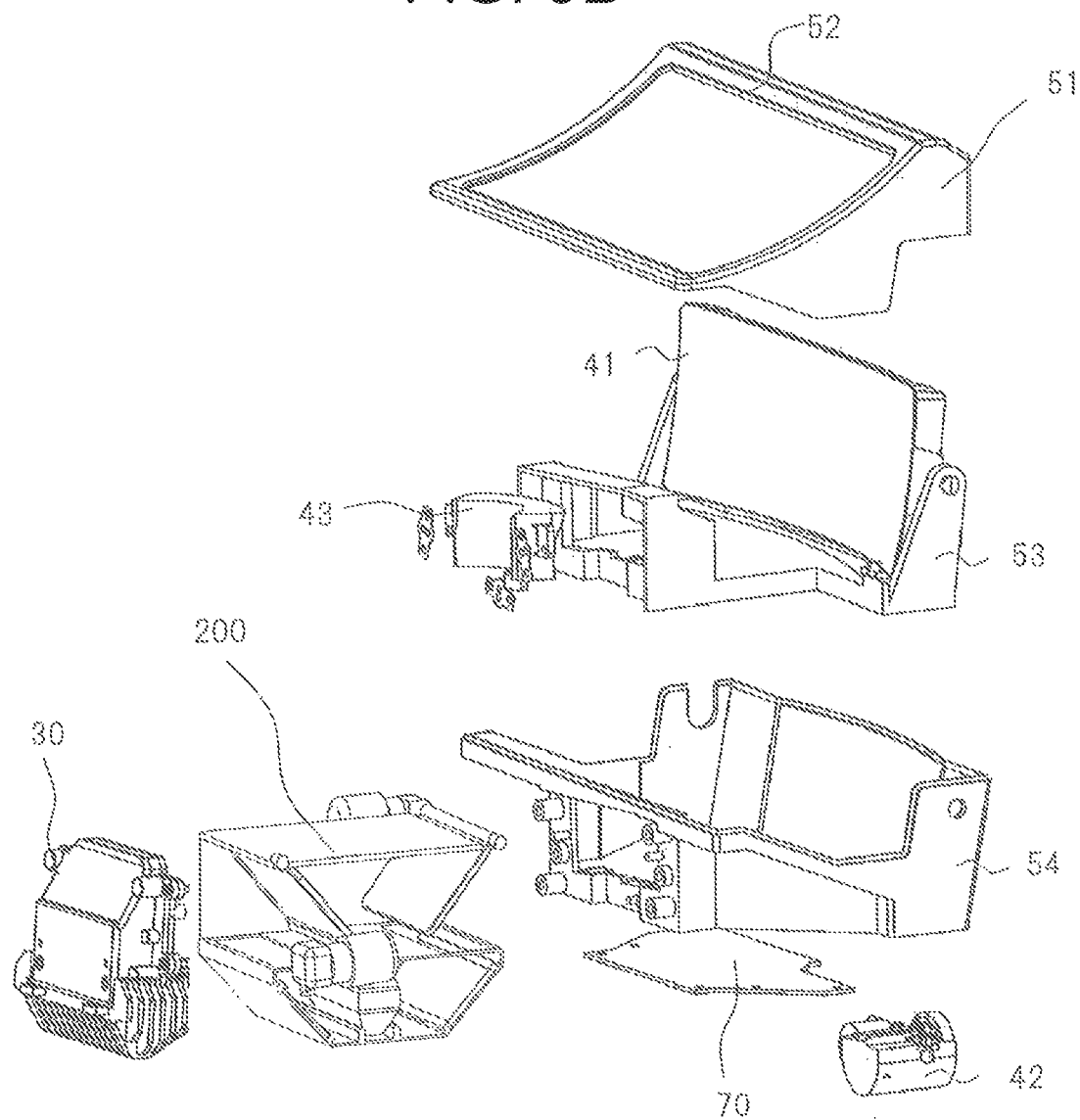
FIG. 9B is a perspective view that shows a state of disintegrating the HUD shown in FIG. 9A into each component.

As shown in FIG. 9A and FIG. 9B, similarly to the HUD 1 according to the first embodiment, the HUD 1B has such configuration that the optical component holding member 53 is accommodated in the exterior case 54, and the upper part is covered by the exterior lid section 51. Also, the image display device 30 of the first embodiment is attached to an aperture of the exterior case 54 through a virtual image distance variable mechanism 200.

Figure 10A:
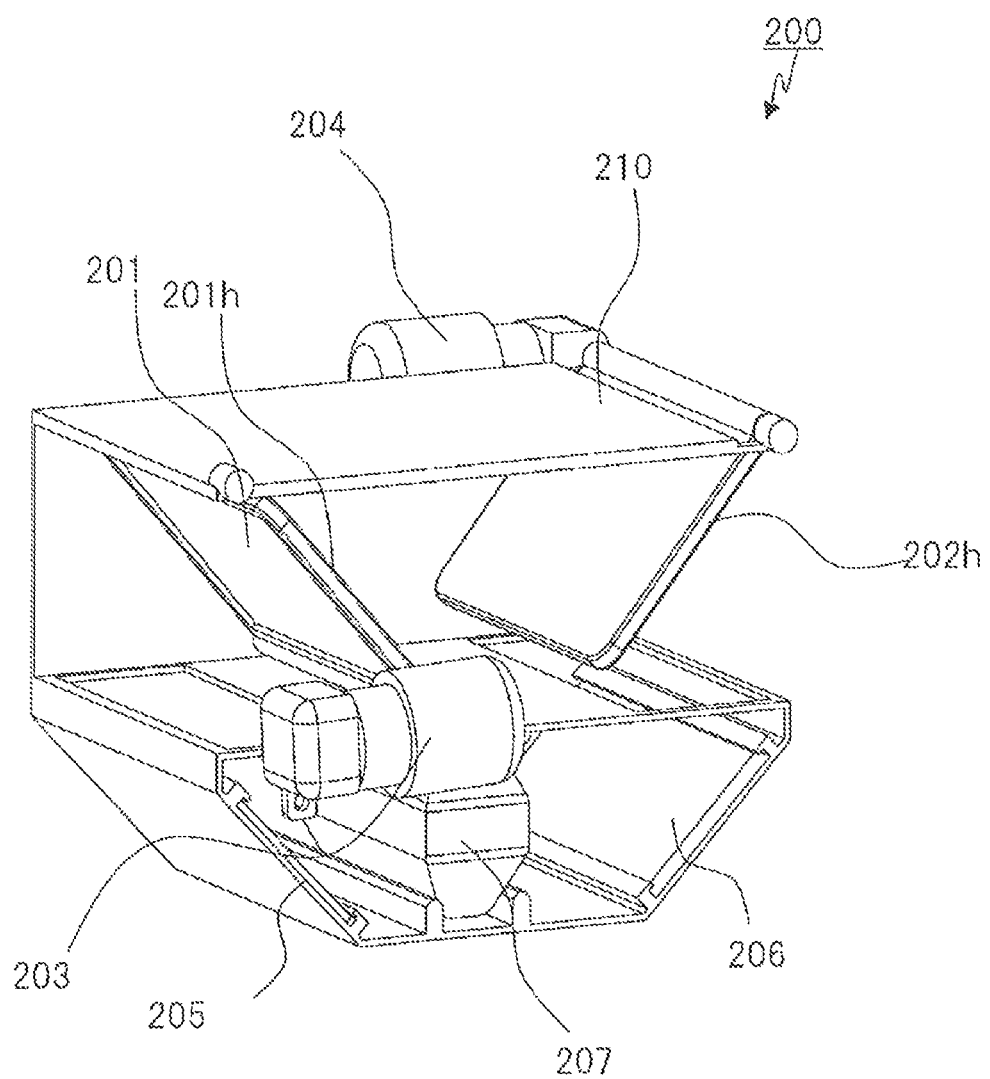
FIG. 10A is a perspective view that shows an example of an external appearance of a virtual image distance variable mechanism.
Figure 10B:
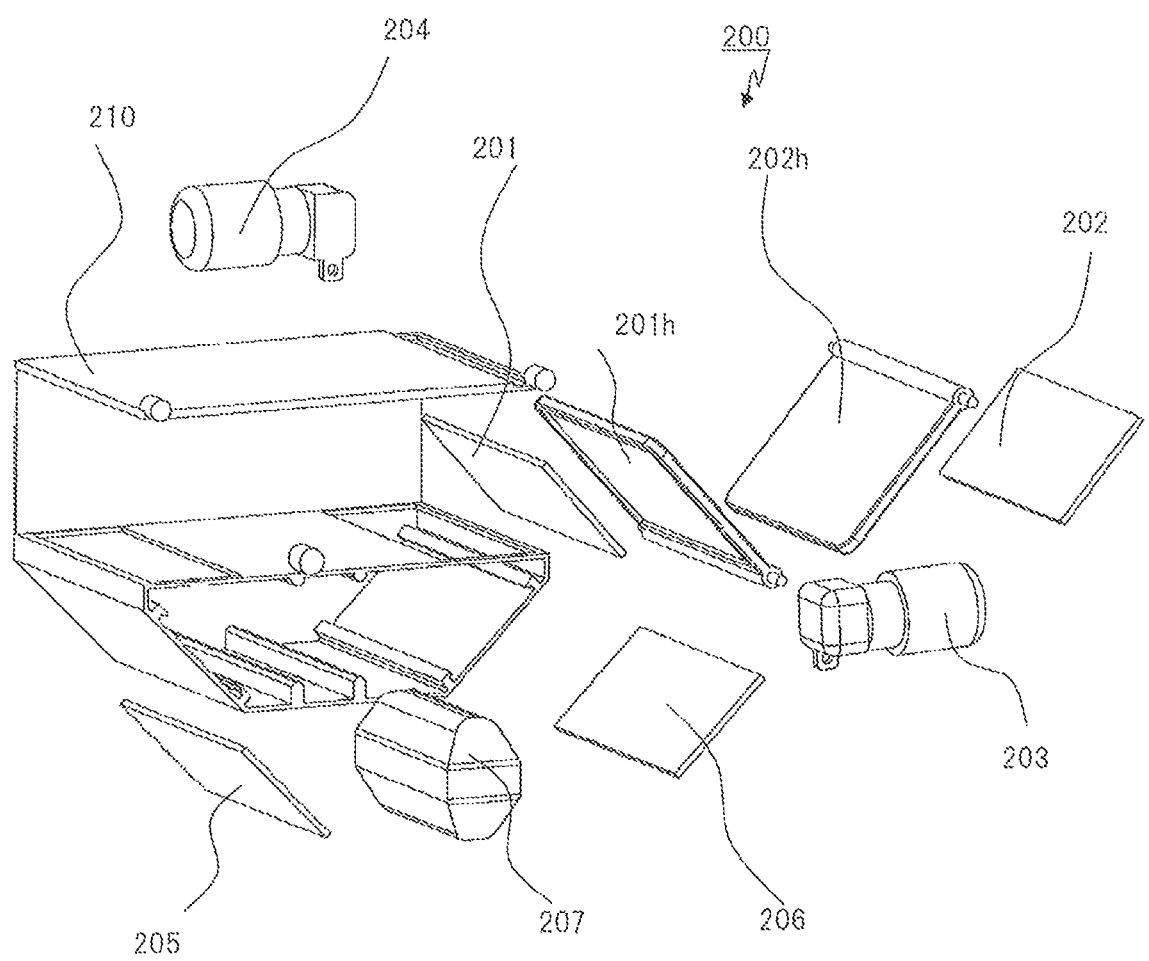
FIG. 10B is a perspective view that shows a state of disintegrating each component of the virtual image distance variable mechanism.

FIG. 10A is a perspective view that shows an example of an external appearance of the virtual image distance variable mechanism 200. FIG. 10B is a perspective view that shows the virtual image distance variable mechanism 200 being disassembled into its components.

As shown in FIG. 10A and FIG. 10B, the virtual image distance variable mechanism 200 includes a virtual image distance variable mechanism housing 210, and includes, in the virtual image distance variable mechanism housing 210, a first folding mirror 201 and a first folding mirror holding section 201h that is a holding member of the first folding mirror 201, the first folding mirror 201 being disposed on a first optical path and reflecting image light towards a second optical path (detour optical path) different from the traveling direction of the first optical path, a first mirror drive section 203 that rotates the first folding mirror holding section 201h for inserting or retracting the mirror surface of the first folding mirror 201 to/from the first optical path, a first intermediate folding mirror 205 disposed on the second optical path and changing the traveling direction of the reflection light from the first folding mirror 201, a second intermediate folding mirror 206 further reflecting reflection light from the first intermediate folding mirror 205, a second folding mirror 202 and a second folding mirror holding section 202h that is a holding member of the second folding mirror 202, the second folding mirror 202 being disposed on the first optical path and reflecting reflection light from the second intermediate folding mirror 206 along the traveling direction of the first optical path, and a second mirror drive section 204 that rotates the second folding mirror holding section 202h for inserting or retracting the mirror surface of the second folding mirror 202 to/from the first optical path.

Further, between the first intermediate folding mirror 205 and the second intermediate folding mirror 206, an optical lens (relay lens) 207 is disposed. Also, each of the first mirror drive section 203 and the second mirror drive section 204 is connected to a controller 220 (equivalent to a mirror control section) that outputs a mirror drive signal (including an insertion signal and a retraction signal) for rotating the first folding mirror holding section 201h and the second folding mirror holding section 202h (refer to FIG. 12A).

In the present embodiment, the mirror surface of the first folding mirror 201 faces the axis of the traveling direction of the image light emitted from the display element 33 of the image display device 30 with a tilting angle in a state of being inserted onto the first optical path. Also, the mirror surface of the second folding mirror 202 faces the axis of the traveling direction of the image light emitted from the display element 33 of the image display device 30 with a tilting angle for reflecting the image light toward the optical axis of the lens unit 43 in a state of being inserted onto the first optical path.

Operation of the HUD 1B according to the present embodiment will be explained referring to FIG. 11, FIG. 12A, FIG. 12B, and FIG. 12C. Each of the first mirror drive section 203, the second mirror drive section 204, and the image display device 30 is connected to the controller 220. The controller 220 executes control of a generation process of image information executed by the image display device 30, and executes drive control with respect to the first mirror drive section 203 and the second mirror drive section 204 according to the generated image information.

Figure 11:
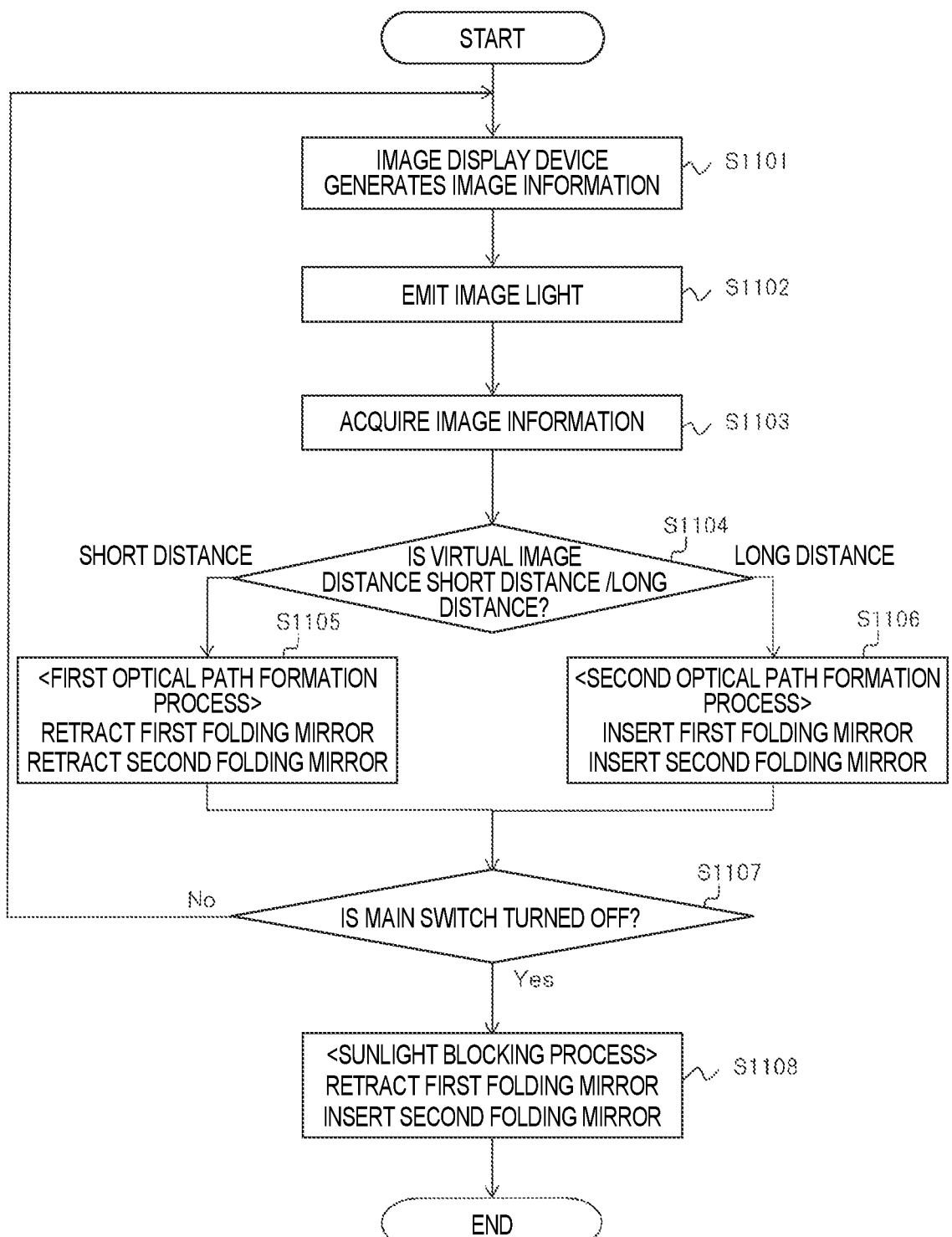
FIG. 11 is a flowchart that shows a flow of an optical path switching process executed by a controller.

FIG. 11 is a flowchart that shows a flow of an optical path switching process executed by the controller 220.

The image display device 30 generates image information that is displayed as a virtual image (S1101), and displays the image information on the display element 33. Irradiation light from the LED light source 31a transmits the display element 33, and the image light is emitted from the emission surface 33a (S1102).

The controller 220 acquires the image information generated by the image display device 30 (S1103), and determines whether the virtual image based on the image information is to be displayed at a short distance or a long distance (S1104).

When the controller 220 determines to display at a short distance (S1104/short distance), a first optical path forming process is executed, that is, a retraction signal for moving the mirror surface of the first folding mirror 201 to a position for retracting from the first optical path is outputted to the first mirror drive section 203, and a retraction signal for moving the mirror surface of the second folding mirror 202 to a position for retracting from the first optical path is outputted to the second mirror drive section 204 (S1105).

Figure 12A:
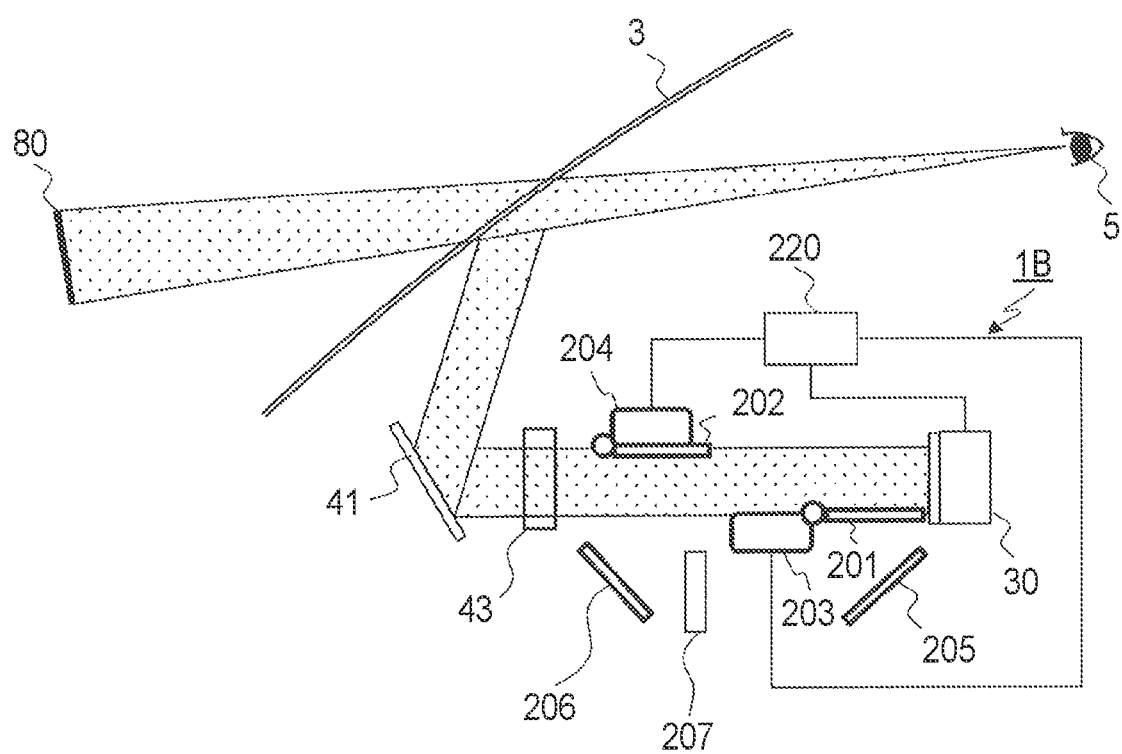
FIG. 12A is a drawing that shows a state where the first optical path has been formed.

FIG. 12A shows a state where the first optical path has been formed. The first optical path is an optical path along which the image light having traveled straight is incident on the lens unit 43. At this time, by turning down the mirror surface of each of the first folding mirror 201 and the second folding mirror 202 with respect to the first optical path, the mirror surfaces retract from the first optical path.

When the controller 220 determines to display at a long distance (S1104/long distance), a second optical path forming process is executed, that is, an insertion signal for inserting the mirror surface of the first folding mirror 201 onto the first optical path is outputted to the first mirror drive section 203, and an insertion signal for disposing the mirror surface of the second folding mirror 202 onto the first optical path and forming the second optical path is outputted to the second mirror drive section 204 (S1106).

Figure 12B:
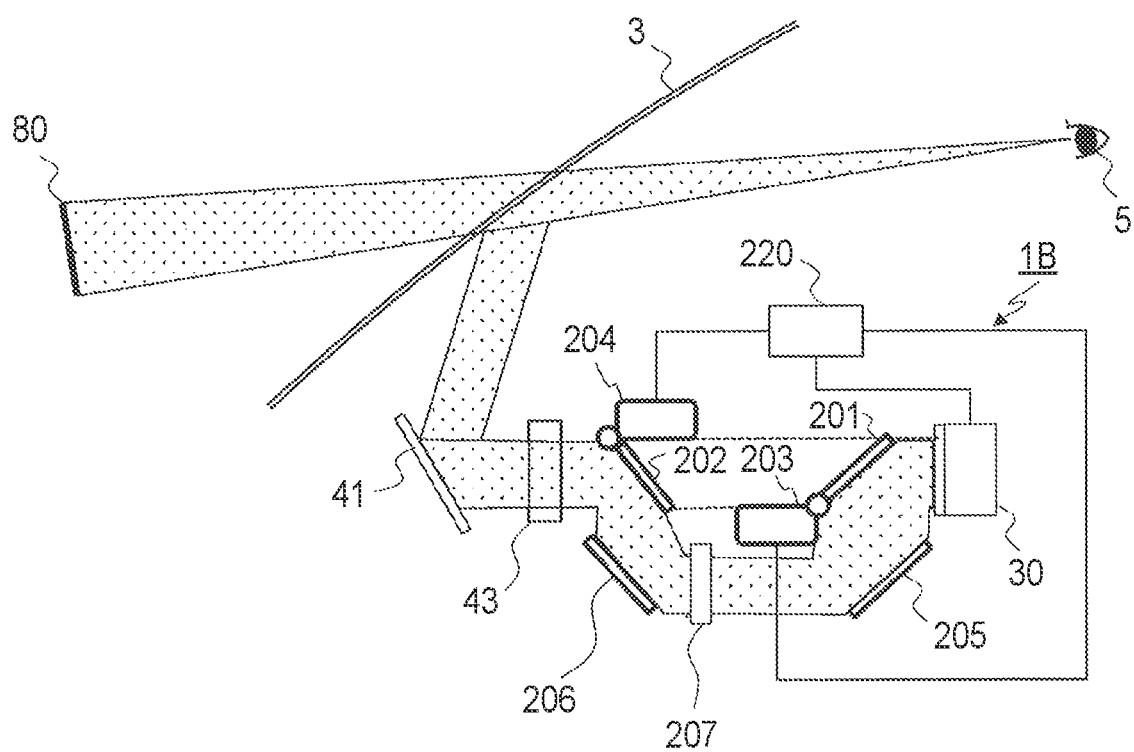
FIG. 12B is a drawing that shows a state where the second optical path has been formed.

FIG. 12B is a drawing that shows a state where the second optical path has been formed. When the image light traveling the second optical path reaches the first folding mirror 201, the image light is reflected towards the first intermediate folding mirror 205 by the first folding mirror 201. The image light having reached the first intermediate folding mirror 205 is further reflected, passes through the optical lens 207, and reaches the second intermediate folding mirror 206. Furthermore, the image light is reflected towards the second folding mirror 202 by the second intermediate folding mirror 206. The image light reflected by the second folding mirror 202 is incident from the aperture of the exterior case 54, and reaches the lens unit 43.

When the main switch of the HUD 1B is not turned off (S1107/No), the process returns to step S1101 to continue the virtual image distance control process.

When the main switch of the HUD 1B is turned off (S1107/Yes), image a sunlight blocking processing is performed to prevent sunlight from entering the image display device 30 (S1108).

Figure 12C:
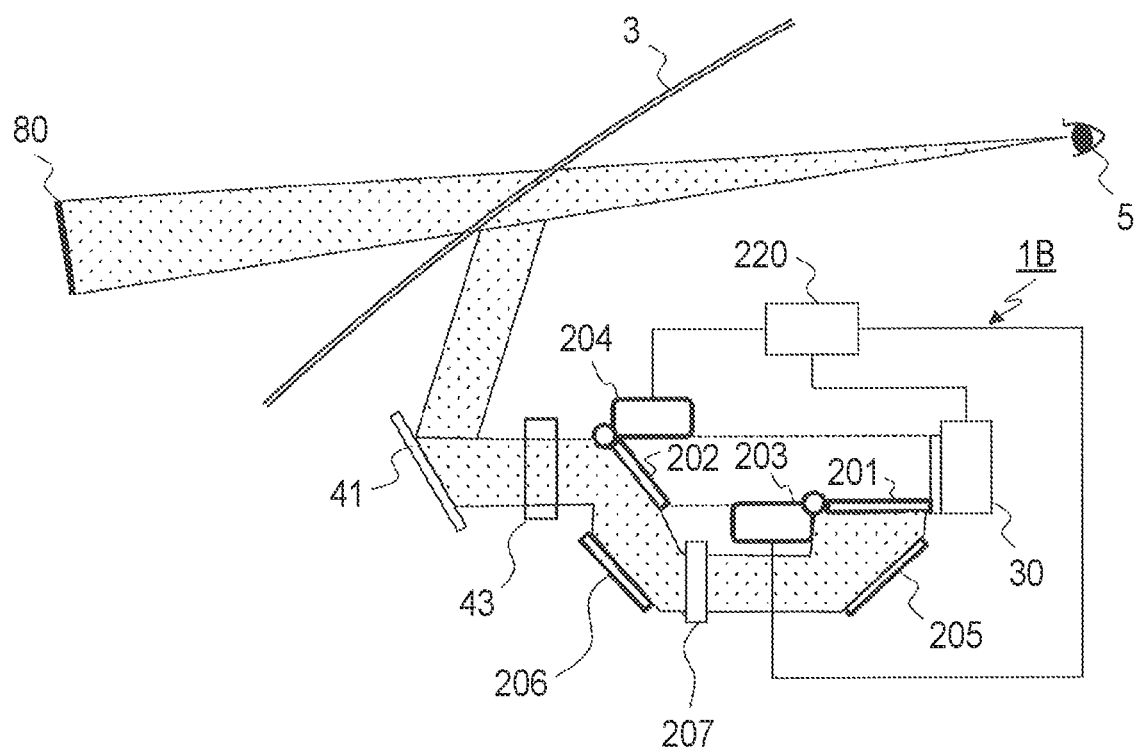
FIG. 12C is a drawing that shows a disposal state of each mirror in a sunlight blocking state.

FIG. 12C shows a disposal state of each mirror in a sunlight blocking state. In the sunlight blocking state, the controller 220 retracts the mirror surface of the first folding mirror 201 from the first optical path, and inserts the mirror surface of the second folding mirror 202 onto the first optical path. Thereby, the sunlight incident on the HUD 1B is emitted from the lens unit 43 and reaches the second folding mirror 202, it is reflected here and its is reflected by the second intermediate folding mirror 206. Also, the sunlight that passes through the optical lens 207 is reflected by the first intermediate folding mirror 205 and reaches the mirror surface of the first folding mirror 201 which has been turned down with respect to the first optical path, and is reflected towards the first intermediate folding mirror 205. As a result, the sunlight which has entered the HUD 1B is folded back by the mirror surface of the first folding mirror 201 having been turned down with respect to the first optical path, and therefore the sunlight can be prevented from entering the image display device 30.

When the formations (2), (3), and (4) described above are applied to the present embodiment, a virtual image by an image having passed through the first optical path can be displayed closer and a virtual image by an image having passed through the second optical path can be displayed farther with the virtual image distance difference obtained by multiplying the square of the magnification of the lens unit 43 to the optical path length difference ΔL between the first optical path and the second optical path.

Figure 13A:
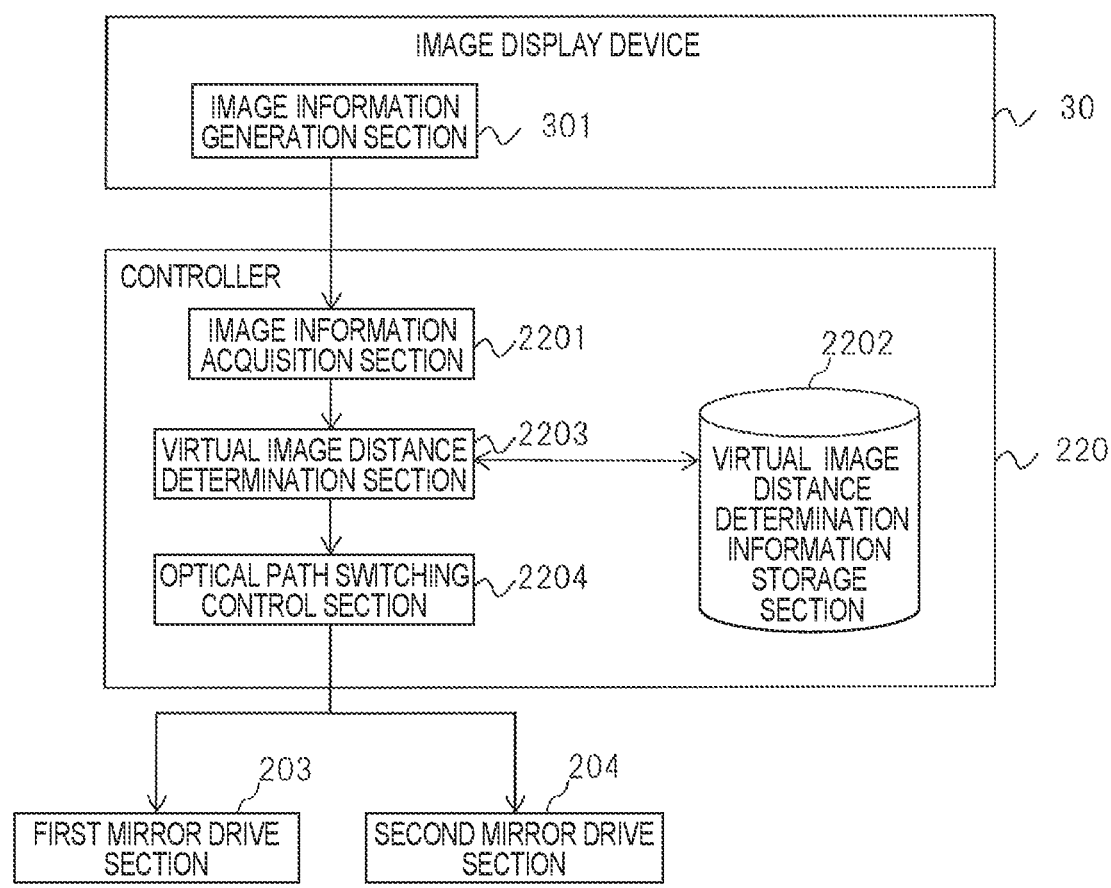
FIG. 13A is a drawing that shows a functional block example of the controller.
Figure 13B:
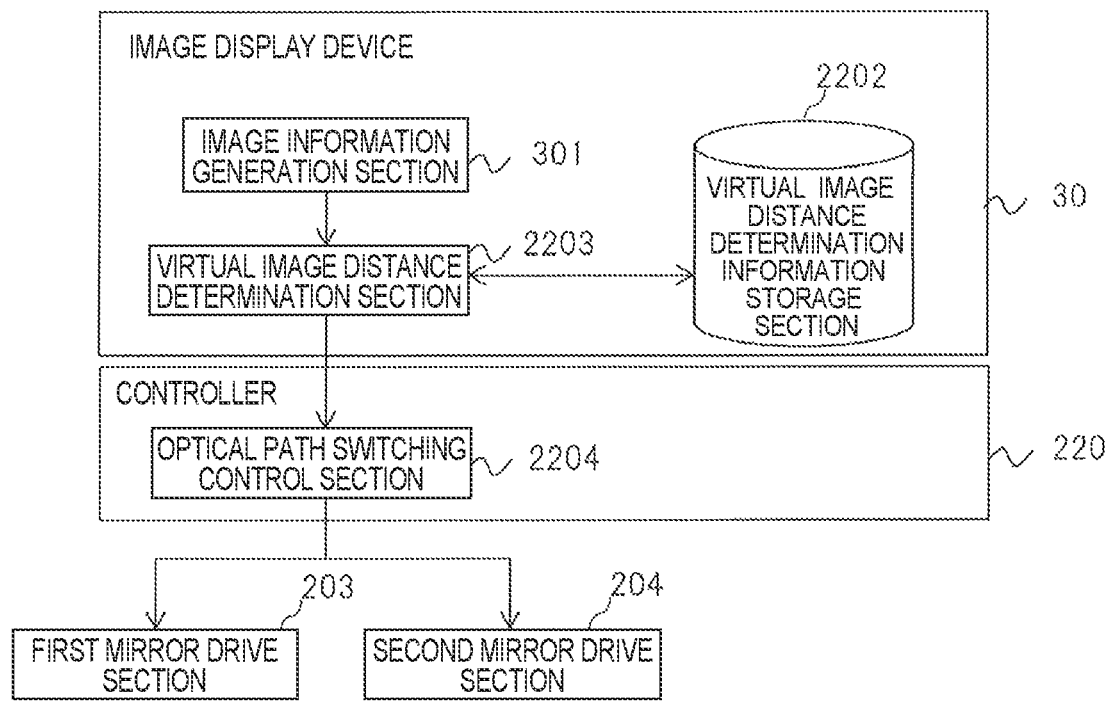
FIG. 13B is a drawing that shows a functional block example of the controller.

The configuration of the controller 220 will be explained referring to FIG. 13A and FIG. 13B. FIG. 13A and FIG. 13B are drawings that show an example of a functional block diagram of the controller.

In the example of FIG. 13A, an image information generation section 301 that generates image information within the image display device 30 is included in the controller 220. Meanwhile, the controller 220 includes an image information acquisition section 2201 that acquires the image information generated by the image information generation section 301, a virtual image distance determination information storage section 2202 storing virtual image distance determination information that relates the image kind and the virtual image distance (either a short distance or a long distance) at the time of displaying the image as a virtual image, a virtual image distance determination section 2203 that determines whether image information obtained from the image information acquisition section 2201 is an image that becomes an object of short distance display or an image that becomes an object of long distance display based on the virtual image distance determination information, and an optical path switching control section 2204 that outputs a mirror drive signal for switching to the first optical path in executing short distance display, to the second optical path in executing long distance display, and to a sunlight blocking state at the time of being turned off based on the determination result to each of the first mirror drive section 203 and the second mirror drive section 204.

In the example of FIG. 13B, the image display device 30 includes the virtual image distance determination section 2203 that acquires image information from the image information generation section 301, refers to the virtual image distance determination information stored in the virtual image distance determination information storage section 2202 that stores the virtual image distance determination information, and determines whether the image information generated is an image that becomes an object of short distance display or an image that becomes an object of long distance display. Meanwhile, it may be configured that the controller 220 is provided with the optical path switching control section 2204, acquires determination information including the determination result of the virtual image distance determination section 2203 from the image display device 30, and outputs a mirror drive signal for switching to the first optical path, the second optical path, or the sunlight blocking state based on the determination information to each of the first mirror drive section 203 and the second mirror drive section 204. The operation flow of the present example mainly differs from the flow of FIG. 111 in that, instead that the controller 220 acquires the image information from the image display device 30 in S1103 of FIG. 11 and the processes of S1104 and onward are started, processes of S1103 to S1104 are executed within the image display device 30 and the process of S1105 and onward are executed after the virtual image distance determination result information by S1104 is outputted to the controller 220.

Figure 14:
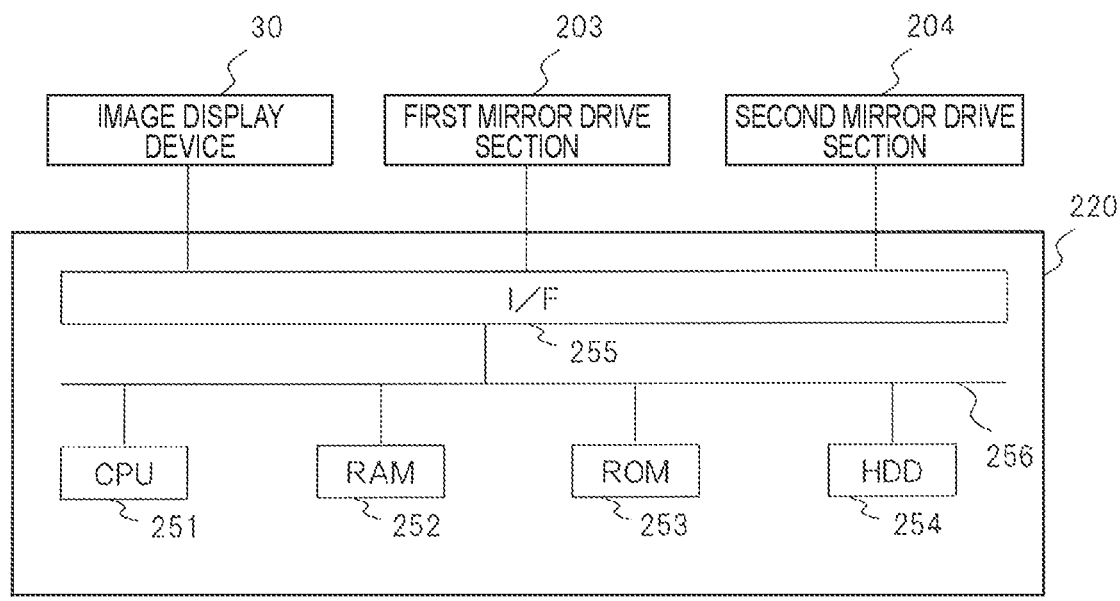
FIG. 14 is a drawing that shows a hardware configuration example of the controller.

FIG. 14 is a drawing that shows a hardware configuration example of the controller 220. The controller 220 includes a CPU (Central Processing Unit) 251, a RAM (Random Access Memory) 252, a ROM (Read Only Memory) 253, an HDD (Hard Disk Drive) 254, and an I/F 255, and is configured by connecting them to each other through a bus 256. The I/F 255 is connected to the image display device 30, the first mirror drive section 203, and the second mirror drive section 204, the image information or the virtual image distance determination result information is inputted to the controller 220, and the mirror drive signal is outputted.

The configuration corresponding to each functional block shown in FIG. 13A and FIG. 13B may be configured by co-working of hardware and a program, the hardware configuring the image display device 30 and the controller 220 shown in FIG. 14, the program achieving the function of each functional block.

The present invention is not limited to the embodiments described above, and it is needless to mention that the present invention can be changed variously within a range not departing from the gist of the present invention. For example, the embodiments described above were explained in detail for easy understanding of the present invention, and are not necessarily limited to those including all configurations explained. Also, a part of a configuration of an embodiment can be replaced by a configuration of another embodiment, and a configuration of an embodiment can be added with a configuration of another embodiment.

Further, with respect to a part of a configuration of each embodiment, addition, deletion, and replacement of other configurations are possible.

REFERENCE SIGNS LIST 1, 1A, 1B . . . HUD
2 . . . Vehicle
3 . . . Windshield
5 . . . Driver
30 . . . Picture display device
31a . . . LED light source
31b . . . Heat sink
32 . . . Illumination optical system 32a . . . Light funnel
32b . . . Light guide body
33 . . . Display element
33a . . . Emission surface
32c . . . Diffusion plate
32d . . . Joining section
33 . . . Display element
34 . . . Flexible cable
35 . . . Frame
36a, 36b . . . Exterior member
41 . . . Free curved surface mirror
42 . . . Mirror drive section
43 . . . Lens unit
50 . . . Exterior housing
51 . . . Exterior lid section
52 . . . Glare trap
53 . . . Optical component holding member
54 . . . Exterior case
55 . . . Optical component holding exterior case
70 . . . Main base plate
80 . . . Virtual image
100 . . . Self-luminous film irradiation device
102 . . . Housing
102a . . . Projector storage section
102b . . . Aperture
102c . . . Middle plate
102d . . . Side plate
102e . . . Ceiling plate
102f, 102g, 102h . . . Slit
104 . . . Projector
110 . . . First self-luminous film
111 . . . First self-luminous film holder
112 . . . Second self-luminous film
113 . . . Second self-luminous film holder
114 . . . Third self-luminous film
115 . . . Third self-luminous film holder
116 . . . Black screen
117 . . . Screen holder
200 . . . Virtual image distance variable mechanism
201 . . . First folding mirror
201h . . . First folding mirror holding section
202 . . . Second folding mirror
202h . . . Second folding mirror holding section
203 . . . First mirror drive section
204 . . . Second mirror drive section
205 . . . First intermediate folding mirror
206 . . . Second intermediate folding mirror
207 . . . Optical lens
210 . . . Virtual image distance variable mechanism housing
220 . . . Controller
251 . . . CPU
252 . . . RAM
253 . . . ROM
254 . . . HDD
255 . . . I/F
256 . . . Bus
301 . . . Picture information generation section
2201 . . . Picture information acquisition section
2202 . . . Virtual image distance determination information storage section
2203 . . . Virtual image distance determination section
2204 . . . Optical path switching control section

The invention claimed is:

1. A head-up display device displaying a virtual image for a driver, comprising:
an image display device that emits image light;
a virtual image optical system that displays an image included in the image light as a virtual image in front of a vehicle by reflecting the image light emitted from the image display device by a projection target member;
a housing that stores the virtual image optical system; and
a virtual image distance variable mechanism that is disposed between the image display device and the virtual image optical system and forms a first optical path and a second optical path, the image light emitted from the image display device being made to be incident on the virtual image optical system in the first optical path, the second optical path being longer than the first optical path,
wherein the virtual image optical system includes a lens unit and a free curved surface mirror disposed along the emission direction of the image light in this order from a position close to the virtual image distance variable mechanism,
the virtual image distance variable mechanism includes:
a first folding mirror that reflects the image light traveling along the first optical path toward the second optical path;
at least one intermediate folding mirror that changes the traveling direction of reflection light from the first folding mirror;
a second folding mirror that reflects reflection light from the intermediate folding mirror so as to follow the traveling direction of the first optical path;
a first mirror drive section that inserts or retracts a mirror surface of the first folding mirror to/from the first optical path;
a second mirror drive section that inserts or retracts a mirror surface of the second folding mirror to/from the first optical path; and
a mirror control section that controls drive of the first mirror drive section and the second mirror drive section,
the mirror control section outputs a retraction signal for retracting a mirror surface of the first folding mirror from the first optical path to the first mirror drive section and outputs a retraction signal for retracting a mirror surface of the second folding mirror from the first optical path to the second mirror drive section at the time of forming the first optical path, and
outputs an insertion signal for inserting a mirror surface of the first folding mirror to the first optical path to the first mirror drive section and outputs an insertion signal for inserting a mirror surface of the second folding mirror to the first optical path to the second mirror drive section at the time of forming the second optical path, and
the lens unit has an optical characteristic of optically enlarging an optical path length difference that is the difference between an optical path length of the first optical path and an optical path length of the second optical path.

2. The head-up display device according to claim 1, wherein the mirror control section executes optical path blocking control of controlling the first mirror drive section or the second mirror drive section with respect to at least one of the first folding mirror or the second folding mirror in order to block both of the first optical path and the second optical path.

3. The head-up display device according to claim 2, wherein the mirror control section executes the optical path blocking control when a main switch has been turned off.

* * * * *